US012580332B2

(12) United States Patent

Sypolt et al.

(10) Patent No.: US 12,580,332 B2

(45) Date of Patent: Mar. 17, 2026

(54) GROUND BUS FOR A CABLE CARD ASSEMBLY OF AN ELECTRICAL CONNECTOR

(71) Applicant: TE Connectivity Solutions GmbH, Schaffhausen (CH)

(72) Inventors: Matthew Jeffrey Sypolt, Harrisburg, PA (US); Richard Elof Hamner, Hummelstown, PA (US); Charles Jameson Valentine, Lancaster, PA (US); John Eugene Westman, Harrisburg, PA (US)

(73) Assignee: TE CONNECTIVITY SOLUTIONS GmbH, Schaffhausen (CH)

( * ) Notice: Subject to any disclaimer, the term of this patent is extended or adjusted under 35 U.S.C. 154(b) by 406 days.

(21) Appl. No.: 18/300,894

(22) Filed: Apr. 14, 2023

(65) Prior Publication Data

US 2024/0347940 A1 Oct. 17, 2024

(51) Int. Cl.

| | |
|---|---|
| ***H01R 13/502*** | (2006.01) |
| ***H01R 12/53*** | (2011.01) |
| ***H01R 12/71*** | (2011.01) |
| ***H01R 13/6591*** | (2011.01) |
| ***H01R 13/6592*** | (2011.01) |

(52) U.S. Cl.

CPC ........... *H01R 12/716* (2013.01); *H01R 12/53* (2013.01); *H01R 13/65914* (2020.08); *H01R 13/6592* (2013.01)

(58) Field of Classification Search

CPC ............................. H01R 12/716; H01R 12/53; H01R 13/65914; H01R 13/6592; H01R 13/652; H01R 13/6461; H01R 13/6585; H01R 13/65918

See application file for complete search history.

(56) References Cited

U.S. PATENT DOCUMENTS

| | | | | |
|---|---|---|---|---|
| 10,714,237 | B1 * | 7/2020 | Hamner | H01R 24/56 |
| 2004/0002262 | A1 * | 1/2004 | Murayama | H01R 13/65918 439/607.1 |
| 2010/0081302 | A1 * | 4/2010 | Atkinson | H01R 13/6474 439/98 |
| 2013/0273781 | A1 * | 10/2013 | Buck | H01R 13/6585 439/626 |
| 2015/0050837 | A1 * | 2/2015 | Wu | H01R 13/6463 439/607.55 |
| 2016/0268739 | A1 * | 9/2016 | Zerebilov | H01R 4/66 |
| 2018/0358752 | A1 * | 12/2018 | Ellison | H01R 9/03 |
| 2020/0244010 | A1 * | 7/2020 | Chua | H01R 13/629 |
| 2021/0234291 | A1 * | 7/2021 | Zerebilov | H01R 12/75 |

* cited by examiner

*Primary Examiner* — Abdullah A Riyami

*Assistant Examiner* — Nelson R. Burgos-Guntin

(57) ABSTRACT

A cable card assembly includes a circuit card having conductors and a contact assembly coupled to the circuit card and cables. The contact assembly includes a contact holder holding signal contacts and a ground bus separate and discrete from the contact assembly. The ground bus is electrically connected to cable shields to electrically connect the cable shields to the ground plane of the circuit card. The ground bus includes a shell having an inner bus member and an outer bus member. The ground bus includes ground blades received in the shell and located between the corresponding cables. The ground blades are electrically connected to the inner bus member and the outer bus member.

22 Claims, 20 Drawing Sheets

GROUND BUS FOR A CABLE CARD ASSEMBLY OF AN ELECTRICAL CONNECTOR

BACKGROUND OF THE INVENTION

The subject matter herein relates generally to electrical connectors.

Electrical connectors are typically used to electrically couple various types of electrical devices to transmit signals between the devices. At least some known cable assemblies have cables between electrical connectors, which are coupled to corresponding electrical devices. The cables each have a signal conductor, or a differential pair of signal conductors surrounded by a shield layer that, in turn, is surrounded by a cable jacket. The shield layer includes a conductive foil, which functions to shield the signal conductor(s) from electromagnetic interference (EMI) and generally improve performance. A drain wire may be provided within the cable, electrically connected to the conductive foil. At an end of the communication cable, the cable jacket, the shield layer, and insulation that covers the signal conductor(s) may be removed (e.g., stripped) to expose the signal conductor(s) and the drain wire. The exposed portions of the signal conductor(s) are then mechanically and electrically coupled (e.g., soldered) to corresponding conductors, such as signal pads of a circuit card. The exposed portions are bent and manipulated between the insulator and the signal pads on the circuit card.

However, signal integrity and electrical performance of the electrical connectors are negatively impacted at the interface between the cables and the circuit card. For example, as the exposed portions of the signal conductors transition to the circuit card, the exposed portions are exposed to air, which affects signal integrity and detrimentally affects performance. Additionally, the spacing between the signal conductors changes as the signal conductors transition, which affects signal integrity. Moreover, the spacing between the signal conductors and the shielding changes as the signal conductors transition, which affects signal integrity.

Accordingly, there is a need for an electrical connector having an improved connection interface with a circuit card.

BRIEF DESCRIPTION OF THE INVENTION

In one embodiment, a cable card assembly for an electrical connector is provided and includes a circuit card having an upper surface and a lower surface. The circuit card has a cable end and a mating end. The circuit card has mating conductors at the mating end for mating with a second electrical connector. The circuit card has circuit conductors at the cable end. The circuit card has a ground plane. The cable card assembly includes cables terminated to the circuit card. The cables include signal conductors and cable shields surrounding the corresponding signal conductors to provide electrical shielding for the signal conductors. The signal conductors include exposed portions that extend forward of the cable shields. The cable card assembly includes a contact assembly coupled to the circuit card and coupled to the cables. The contact assembly includes a contact holder holding signal contacts. Each signal contact includes a base tab and a mating tab. The base tab is terminated to the corresponding circuit conductor. The mating tab is terminated to the corresponding signal conductor. The cable card assembly includes a ground bus separate and discrete from the contact assembly and is coupled to the contact assembly. The ground bus is electrically connected to the cable shields to electrically connect the cable shields of the cables. The ground bus is electrically connected to the ground plane of the circuit card. The ground bus includes a shell that has an inner bus member and an outer bus member. Ends of the cables are located between the inner bus member and the outer bus member. The inner bus member is located between the cables and the circuit card. The ground bus includes ground blades received in the shell and located between the corresponding cables. The ground blades are electrically connected to the inner bus member and are electrically connected to the outer bus member.

In another embodiment, a ground bus for electrically connecting cables to a circuit card of a cable card assembly is provided. The ground bus includes a shell including an inner bus member and an outer bus member separate and discrete from the inner bus member. The inner bus member includes a bottom configured to be mounted to the circuit card. The inner bus member includes cable cradles configured to receive the corresponding cables. The inner bus member includes openings configured to receive contacts of the cable card assembly terminated to ends of conductors of the cables for connection to the circuit card. The inner bus member is configured to be positioned between the cables and the circuit card. The outer bus member includes covers configured to cover the cables. The inner bus member is electrically conductive and provides shielding around portions of the cables. The outer bus member is electrically conductive and provides shielding around portions of the cables. The ground bus includes ground blades received in the shell and configured to be positioned between the cables to provide shielding between the corresponding cables. The ground blades are electrically connected to the inner bus member and are electrically connected to the outer bus member.

In a further embodiment, an electrical connector is provided and includes a housing having walls that form a cavity. The housing has a mating end configured to be mated with a second electrical connector. The electrical connector includes a cable card assembly received in the cavity of the housing. The cable card assembly includes a circuit card, a contact assembly coupled to the circuit card, cables terminated to the contact assembly, and a ground bus coupled to the circuit card. The circuit card has an upper surface and a lower surface. The circuit card has a cable end and a mating end. The circuit card includes a ground plane. The circuit card has circuit conductors at the cable end. The circuit card has mating conductors at the mating end. The cables include signal conductors and cable shields surrounding the corresponding signal conductors to provide electrical shielding for the signal conductors. The signal conductors have exposed portions that extend forward of the cable shields. The contact assembly includes a contact holder holding signal contacts. Each signal contact includes a base tab and a mating tab. The base tab is terminated to the corresponding circuit conductor. The mating tab is terminated to the corresponding signal conductor. The ground bus is electrically connected to the cable shields to electrically common the cable shields of the cables. The ground bus is electrically connected to the ground plane of the circuit card. The ground bus includes a shell has an inner bus member and an outer bus member. The ground bus includes ground blades received in the shell and located between the corresponding cables. The ground blades are electrically connected to the inner bus member and are electrically connected to the outer bus member.

DETAILED DESCRIPTION OF THE INVENTION

Figure 1:
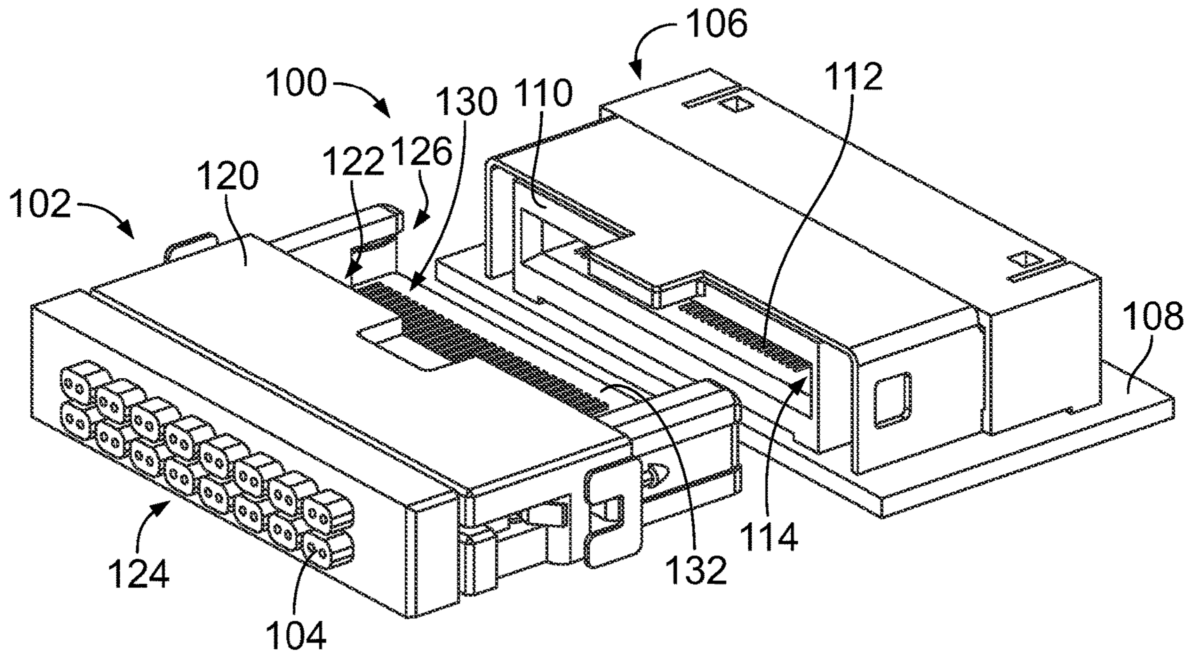
FIG. 1 is a perspective view of a communication system in accordance with an exemplary embodiment.

FIG. 1 is a perspective view of a communication system 100 in accordance with an exemplary embodiment. The communication system 100 includes a first electrical connector 102 provided at ends of cables 104 and a second electrical connector 106. In the illustrated embodiment, the second electrical connector 106 is mounted to a circuit board 108. In other various embodiments, the second electrical connector 106 may be provided at ends of cables (not shown).

In an exemplary embodiment, the second electrical connector 106 is a receptacle connector. The second electrical connector 106 may be a card edge connector having a card slot. In other embodiments, the second electrical connector 106 may be a socket connector. The first electrical connector 102 is mated to the second electrical connector 106. In an exemplary embodiment, the first electrical connector 102 is a plug connector configured to be pluggably coupled to the second electrical connector 106. For example, a portion of the first electrical connector 102 may be plugged into a receptacle of the second electrical connector 106. In an exemplary embodiment, the first electrical connector 102 is coupled to the second electrical connector 106 at a separable interface. For example, the first electrical connector 102 is latchably coupled to the second electrical connector 106. The connectors 102, 106 may be input-output (I/O) connectors.

The second electrical connector 106 includes a receptacle housing 110 holding an array of contacts 112. In an exemplary embodiment, the receptacle housing 110 includes an opening 114 that receives the first electrical connector 102. The opening 114 may be a card slot configured to receive a circuit card. The opening 114 is located at the front of the receptacle housing 110 in the illustrated embodiment. Other locations are possible in alternative embodiments, such as at the top. The contacts 112 have separable mating interfaces. The contacts 112 may define a compressible interface, such as including deflectable spring beams that are compressed when the first electrical connector 102 is received in the opening 114. Optionally, the contacts 112 may be arranged in multiple rows along the top and the bottom of the opening 114. In various embodiments, the second electrical connector 106 is a communication device, such as a card edge socket connector. However, the second electrical connector 106 may be another type of electrical connector in an alternative embodiment. The second electrical connector 106 may be a high-speed connector.

The first electrical connector 102 includes a housing 120 having a cavity 122 that receives a cable card assembly 130. The housing 120 has a cable end 124 and a mating end 126 opposite the cable end 124. The cables 104 extend from the cable end 124. The mating end 126 is configured to be coupled to the second electrical connector 106. In the illustrated embodiment, the cable end 124 is at the rear of the housing 120 and the mating end 126 is at the front of the housing 120. Other locations are possible in alternative embodiments, including having the mating end 126 perpendicular to the cable end 124. The cable card assembly 130 includes a circuit card 132. The cables 104 are configured to be terminated to the circuit card 132. The circuit card 132 is configured to be plugged into the opening 114 when the first electrical connector 102 is mated with the second electrical connector 106. For example, an edge of the circuit card 132 may be plugged into the opening 114 defining the card slot.

Figure 2:
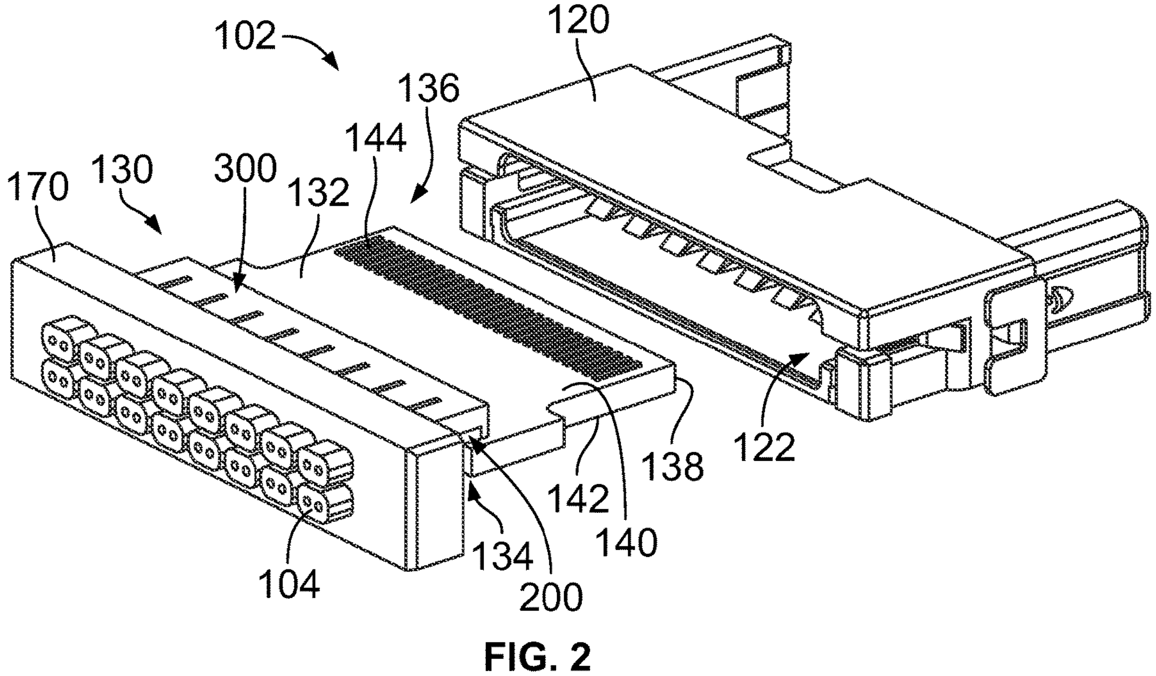
FIG. 2 is an exploded view of the first electrical connector in accordance with an exemplary embodiment.

FIG. 2 is an exploded view of the first electrical connector 102 in accordance with an exemplary embodiment. The first electrical connector 102 includes the housing 120 and the cable card assembly 130. The housing 120 receives the cable card assembly 130 in the cavity 122 to hold the circuit card 132 and the cables 104. In an exemplary embodiment, the cable card assembly 130 includes a contact assembly 200 and a ground bus 300 separate and discrete from the contact assembly 200. The contact assembly 200 is coupled to the cables 104, such as signal conductors of the cables 104. The contact assembly 200 is coupled to the circuit card 132. For example, the contact assembly 200 is electrically connected to circuits or conductors of the circuit card 132. The ground bus 300 is coupled to the cables 104, such as cables shields of the cables 104. The ground bus 300 is coupled to the circuit card 132. For example, the ground bus 300 is electrically connected to circuits or conductors of the circuit card 132, such as to a ground plane of the circuit card 132.

The ground bus 300 provides electrical shielding for the signal conductors of the cables 104 and for signal contacts of the contact assembly 200. The ground bus 300 is electrically connected to the shield structures of the cables 104, such as to cable shields of the cables 104 and/or drain wires of the cables 104. In an exemplary embodiment, the ground bus 300 is soldered to the cable shields. However, the ground bus 300 may be electrically connected to the shield structures of the cables 104 by other means in alternative embodiments, such as soldering to the drain wires, welding to the drain wires, press-fitting the drain wires into a compliant feature of the ground bus 300, using conductive adhesive, using a conductive tape or braid, using a conductive gasket, conductive foam, conductive epoxy, and the like. The ground bus 300 may be coupled to the circuit card 132 at a solderless connection, such as at an interference or press-fit connection. In various embodiments, multiple ground busses 300 may be provided, such as at the top side and/or the bottom sides of the circuit card 132. The multiple ground busses 300 may be offset, such as shifted front-to-rear and/or side-to-side.

During assembly, the cables 104 are terminated to the contact assembly 200 and the contact assembly 200 is terminated to the circuit card 132. The cable card assembly 130, including the circuit card 132, the cables 104, the contact assembly 200, and the ground bus 300, may be loaded into the housing 120, such as into a rear of the housing 120. The cable card assembly 130 may be secured in the housing 120 using latches, fasteners or other securing devices. In an exemplary embodiment, the ends of the cables 104 may be surrounded by a strain relief element 170. For example, the strain relief element 170 may be molded or otherwise formed around the cables 104. The strain relief element 170 may be secured to the circuit card 132, such as being molded to the circuit card 132. Optionally, multiple strain relief elements 170 may be provided, such as upper and lower strain relief elements.

In various embodiments, the cable card assembly 130 may have a single row of cables on the top side and a single row of cables connected to the bottom side of the circuit card 132. However, the cable card assembly 130 may include multiple rows of cables 104. Each row of cables 104 includes the corresponding contact assembly 200 and ground bus 300. The contact assemblies 200 and the ground busses 300 may be similar for each of the rows. However, the contact assemblies 200 and ground busses 300 may be sized and shaped differently to accommodate a stacking/overlapping situation.

The circuit card 132 extends between a cable end 134 (for example, rear portion) and a mating end 136 (for example, front portion). The circuit card 132 has a rear edge at the rear of the cable end 134 and the cables are configured to be coupled to the circuit card 132 at the cable end 134 and extend rearward from the circuit card 132. The circuit card 132 has a card edge 138 at the front of the mating end 136 configured to be plugged into the opening 114 (shown in FIG. 1) of the second electrical connector 106 (shown in FIG. 1). The circuit card 132 includes an upper surface 140 and a lower surface 142. The circuit card 132 may have any reasonable length between the cable end 134 and the mating end 136, depending on the particular application, and may have electrical components mounted to the circuit card 132 between the cable end 134 and the mating end 136.

The circuit card 132 includes circuit conductors 144, such as mating pads, traces, vias, and the like. In an exemplary embodiment, the circuit conductors 144 are provided at the cable end 134 for connection to the contact assembly 200 and at the mating end 136 for connection to the second electrical connector 106. The circuit conductors 144 at the mating end 136 define mating conductors configured to be electrically connected to corresponding contacts 112 (shown in FIG. 1) of the second electrical connector 106. The mating conductors are provided proximate to the card edge 138. However, in alternative embodiments, the mating end 136 is defined by the bottom of the circuit card 132 and the mating conductors are provided only on the lower surface 142, such as for mating with socket contacts of a socket connector. The circuit conductors 144 at the cable end 134 are configured to be electrically connected to the signal contacts of the contact assembly 200 and/or the ground bus 300. The circuit conductors 144 may be provided at both the upper surface 140 and the lower surface 142. The circuit conductors 144 may include both signal conductors and ground conductors of the circuit card 132. Optionally, the circuit conductors 144 may be arranged in a ground-signal-signal-ground arrangement. The lengths and/or widths of the signal conductors may be different than the ground conductors. The spacing between the signal conductors (i.e., pitch) may be different than the spacing between the signal conductors and the ground conductors.

The cables 104 are terminated to the contact assembly 200 and the contact assembly 200 is terminated to the circuit card 132. The ground bus 300 is terminated to the cables 104 and the circuit card 132. The contact assembly 200 provides an electrical interface between the cables 104 and the circuit card 132. The contact assembly 200 controls routing of signals from the cables 104 to the circuit card 132. The ground bus 300 provides electrical shielding for the contact assembly 200. The ground bus 300 provides electrical shielding at the interface with the cables 104. The ground bus 300 provides electrical shielding at the interface with the circuit card 132.

Figure 3:
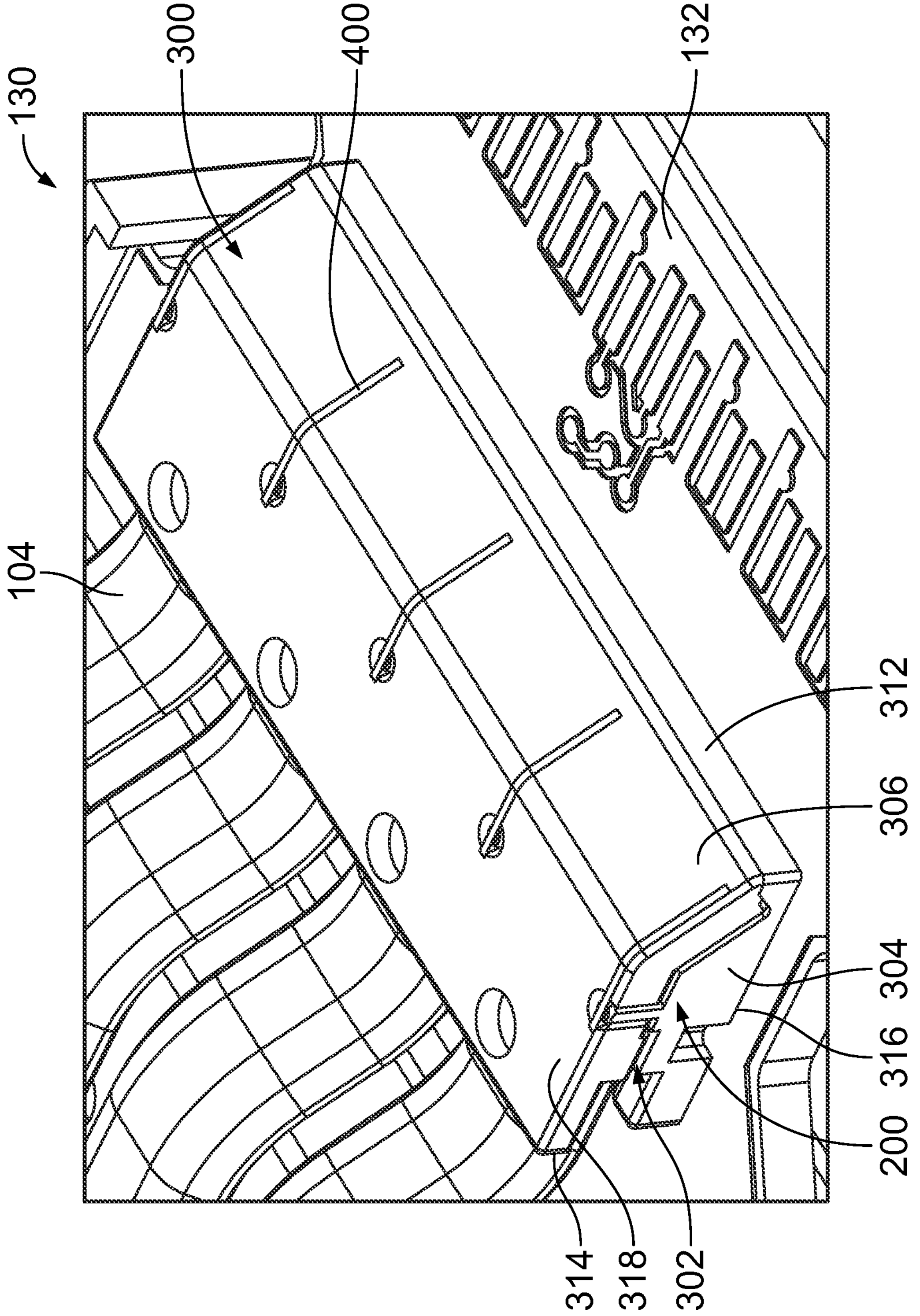
FIG. 3 is a perspective view of a portion of the cable card assembly in accordance with an exemplary embodiment.

FIG. 3 is a perspective view of a portion of the cable card assembly 130 in accordance with an exemplary embodiment. FIG. 3 shows the ground bus 300 surrounding the ends of the cables 104 and terminated to the circuit card 132. The cable card assembly 130 may have multiple rows of cables 104 and corresponding ground busses 300 with the cables 104 in the forward row routed over (for example, flyover) the rearward located ground bus 300. Other arrangements are possible in alternative embodiments.

The ground bus 300 is configured to be coupled to the contact assembly 200 to provide electrical shielding along the signal paths. The ground bus 300 provides electrical shielding for signals transmitted between the circuit card 132 and the cables 104. The ground bus 300 enhances electrical performance of the cable card assembly 130, such as by reducing cross talk. The ground bus 300 includes a shell 302 manufactured from a conductive material, such as a metal material to provide electrical shielding. In various embodiments, the ground bus 300 may be a diecast component. In other various embodiments, the ground bus 300 may be a stamped and formed component.

In an exemplary embodiment, the ground bus 300 is a multipiece structure. The ground bus 300 includes an inner bus member 304, an outer bus member 306, and ground blades 400 electrically connecting the inner and outer bus members 304, 306. The ground blades 400 may additionally mechanically connect the inner and outer bus members 304, 306. The inner bus member 304 is located between the outer bus member 306 and the circuit card 132. The ground bus 300 may be oriented such that the inner bus member 304 is a bottom bus member and the outer bus member 306 is a top bus member. However, other orientations are possible in alternative embodiments. The cables 104 are received between the inner bus member 304 and the outer bus member 306. The ground blades 400 are located between the cables 104 to connect the inner and outer bus members 304, 306 at locations between the cables 104. In an exemplary embodiment, both the inner bus member 304 and the outer bus member 306 are electrically connected to the cable shields 160 (shown in FIG. 4) of the cables 104. For example, both the inner bus member 304 and the outer bus member 306 directly engage the cable shields 160 of the cables 104. The ground blades 400 may be electrically connected to the cables 104, such as having the drain wires 164 (shown in FIG. 4) terminated to the ground blades 400.

The ground bus 300 extends between a front 312 and a rear 314. The rear 314 is configured to face the cables 104. The ground bus 300 extends between an inner end 316 and an outer end 318. The inner bus member 304 is at the inner end 316 and the outer bus member 306 is at the outer end 318. The ground bus 300 may be oriented such that the inner end 316 is a bottom end and the outer end 318 is a top end. However, other orientations are possible in alternative embodiments. In various embodiments, the inner end 316 is at the bottom and is configured to face the circuit card 132. The inner end 316 may be mounted to the circuit card 132 to mechanically and electrically connect the ground bus 300 to the circuit card 132. The ground blades 400 are received in slots in the inner and outer bus members 304, 306, which may be open at the inner end 316 and/or the outer end 318 to receive the ground blades 400.

Figure 4:
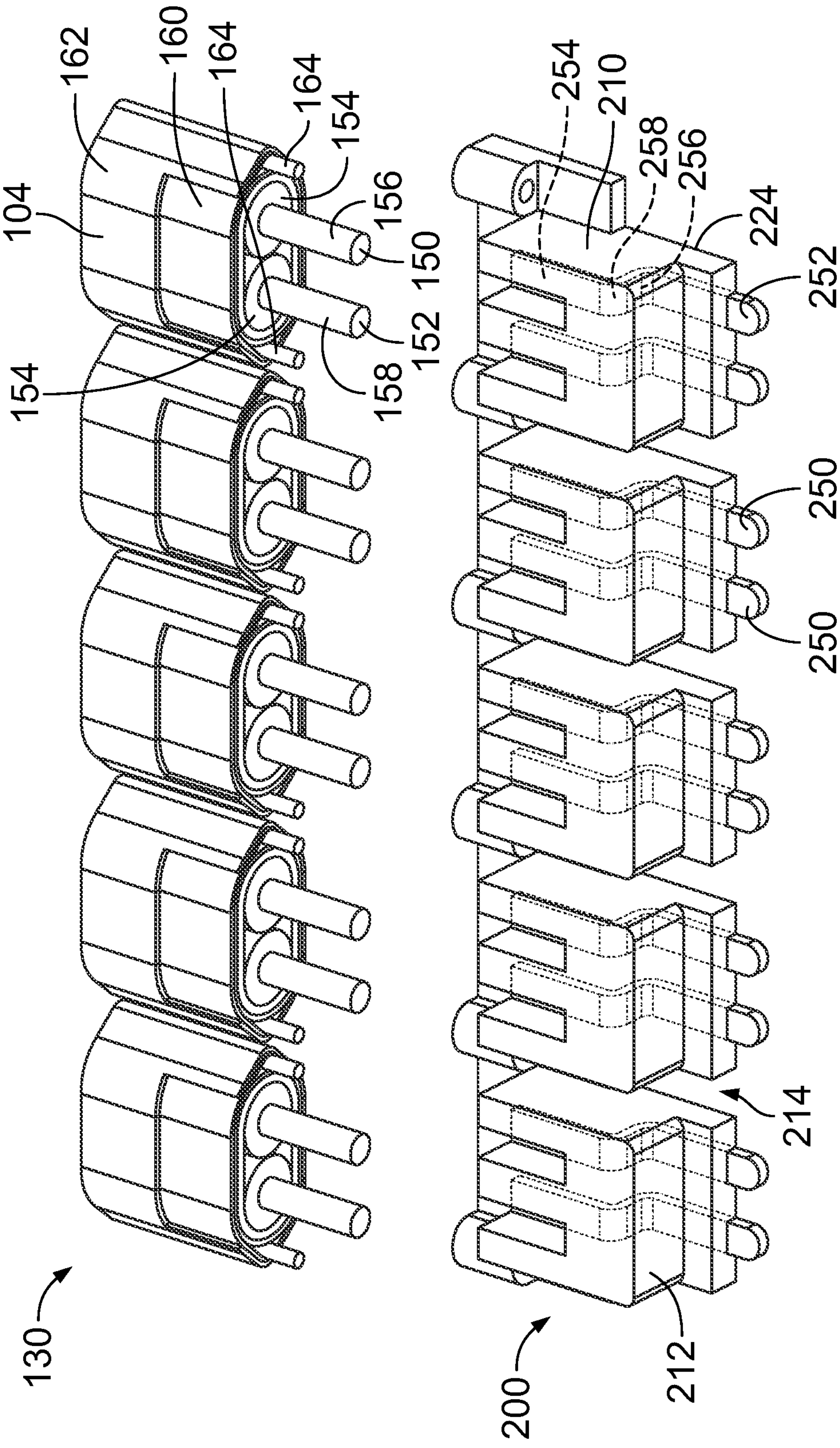
FIG. 4 is an exploded view of a portion of the cable card assembly in accordance with an exemplary embodiment showing a plurality of the cables and the contact assembly.

FIG. 4 is an exploded view of a portion of the cable card assembly 130 in accordance with an exemplary embodiment showing a plurality of the cables 104 and the contact assembly 200. The ground bus 300 (shown in FIG. 3) is not shown in FIG. 4. The contact assembly 200 provides a connectorized interface between the cables 104 and the circuit card 132 (shown in FIG. 3). The contact assembly 200 enhances electrical performance of the cable card assembly 130, such as by controlling routing of the signal paths, controlling the dielectric material surrounding the signal paths, and providing robust interfaces between the circuit card 132 and the cables 104.

Each cable 104 includes at least one signal conductor and a shield structure providing electrical shielding for the at least one signal conductor. In an exemplary embodiment, the cables 104 are twin-axial cables. For example, each cable 104 includes a first signal conductor 150 and a second signal conductor 152. The signal conductors 150, 152 carry differential signals. The signal conductors 150, 152 are configured to be electrically connected to corresponding circuit conductors 144 of the circuit card 132 through the contact assembly 200.

The cable 104 includes one or more insulators 154 surrounding the signal conductors 150, 152 and a cable shield 160 surrounding the insulators 154. The cable shield 160 provides circumferential shielding around the signal conductors 150, 152. The cable 104 includes a cable jacket 162 surrounding the cable shield 160. In various embodiments, the cable 104 includes one or more drain wires 164 electrically connected to the cable shield 160. In alternative embodiments, the cable 104 is provided without a drain wire.

In an exemplary embodiment, the cable jacket 162, the cable shield 160, and the insulators 154 may be removed (e.g., stripped) to expose portions of the signal conductors 150, 152, which are referred to hereinafter as exposed portions 156, 158, and to expose portions of the drain wires 164. The exposed portions 156, 158 of the signal conductors 150, 152 are configured to be mechanically and electrically coupled (e.g., soldered) to corresponding signal contacts 250 of the contact assembly 200. In an exemplary embodiment, the exposed portions 156, 158 extend axially (for example, straight outward or forward) from the insulators 154 to distal ends. However, the exposed portions 156, 158 may be bent, such as bent inward toward each other (distance between reduced for tighter coupling and smaller trace spacing) and/or may be bent toward the circuit card 132. The cable shield 160 does not extend along the exposed portions 156, 158. However, the ground bus 300 extends along the exposed portions 156, 158 and provides shielding for the exposed portions 156, 158. The ground bus 300 may be shaped and positioned relative to the exposed portions 156, 158 to control impedance along the signal paths. For example, the ground bus 300 may be shaped and positioned relative to the exposed portions 156, 158 to maintain a target impedance along the signal paths (for example, 50 Ohms, 75 Ohms, 100 Ohms, and the like).

The contact assembly 200 includes a contact holder 210 holding a plurality of signal contacts 250. In an exemplary embodiment, the signal contacts 250 are arranged in pairs. The contact holder 210 is manufactured from a dielectric material, such as a plastic material. The contact holder 210 is formed around the signal contacts 250 in various embodiments. For example, the signal contacts 250 may be formed as a lead frame and the contact holder 210 is overmolded around the lead frame. However, in alternative embodiments, the contact holder 210 may be preformed and the signal contacts 250 may be loaded or stitched into the contact holder 210. In an exemplary embodiment, the contact holder 210 is a single, unitary piece molded around all of the signal contacts 250. However, in alternative embodiments, the contact holder 210 may be formed by multiple pieces or holder elements each holding corresponding signal contacts 250, such as each holding the corresponding pair of the signal contacts 250.

The contact holder 210 includes contact blocks 212 separated by gaps 214. Each contact block 212 holds the corresponding signal contacts 250, such as each holding the corresponding pair of the signal contacts 250. The gaps 214 separate portions of the contact blocks 212. The gaps 214 are configured to receive portions of the ground bus 300 to allow electrical shielding between the contact blocks 212. In an exemplary embodiment, the contact blocks 212 are connected by a connecting wall or portion of the contact holder 210, such as along the bottom or rear of the contact holder 210. However, in alternative embodiments, the contact holder 210 may be provided without the connecting wall. Rather, each contact block 212 is separate and discrete from the other contact blocks 212.

The signal contacts 250 are routed through the contact holder 210 to provide signal paths between the signal conductors 150, 152 and the circuit card 132. In an exemplary embodiment, the signal contacts 250 are stamped and formed contacts. In various embodiments, the signal contacts 250 may be formed as a lead frame on a carrier strip (not shown), which is later removed after the contact holder 210 is overmolded around the signal contacts 250.

Each signal contact 250 includes a base tab 252 and a mating tab 254. The base tab 252 may be a lower solder tab and the mating tab 254 may be an upper solder tab. The signal contact 250 includes a transition portion 256 between the base tab 252 and the mating tab 254. The transition portion 256 includes one or more bends 258 to transition between the base tab 252 and the mating tab 254. The transition portion 256 transitions out of plane relative to the base tab 252 and the mating tab 254. For example, the transition portion 256 may extend generally perpendicular to the base tab 252 and generally perpendicular to the mating tab 254. The contact assembly 200 may be oriented such that the transition portion 256 extends vertically.

The base tab 252 is configured to be terminated to the corresponding circuit conductor 144 (shown in FIG. 2) of the circuit card 132. In various embodiments, the base tab 252 is a solder tab configured to be soldered to the circuit conductor 144. However, in alternative embodiments, the base tab 252 may be terminated by other processes, such as having a compliant pin that is press-fit into the circuit card 132. In an exemplary embodiment, the base tab 252 extends parallel to the inner end 224 of the contact holder 210. Each of the base tabs 252 are generally coplanar and may be co-planer with the inner end 224 of the contact holder 210. The contact assembly 200 may be oriented such that the base tabs 252 extend horizontally.

The mating tab 254 is configured to be terminated to the corresponding signal conductor 150, 152. In various embodiments, the mating tab 254 is a pad configured to be soldered or laser welded to the signal conductor 150, 152. However, in alternative embodiments, the mating tab 254 may be terminated by other processes, such as having a crimp barrel that is crimped to the signal conductor 150, 152. In an exemplary embodiment, the mating tab 254 extends parallel to the inner end 224. Each mating tab 254 may be generally coplanar. The contact assembly 200 may be oriented such that the mating tabs 254 extend horizontally.

Figure 5:
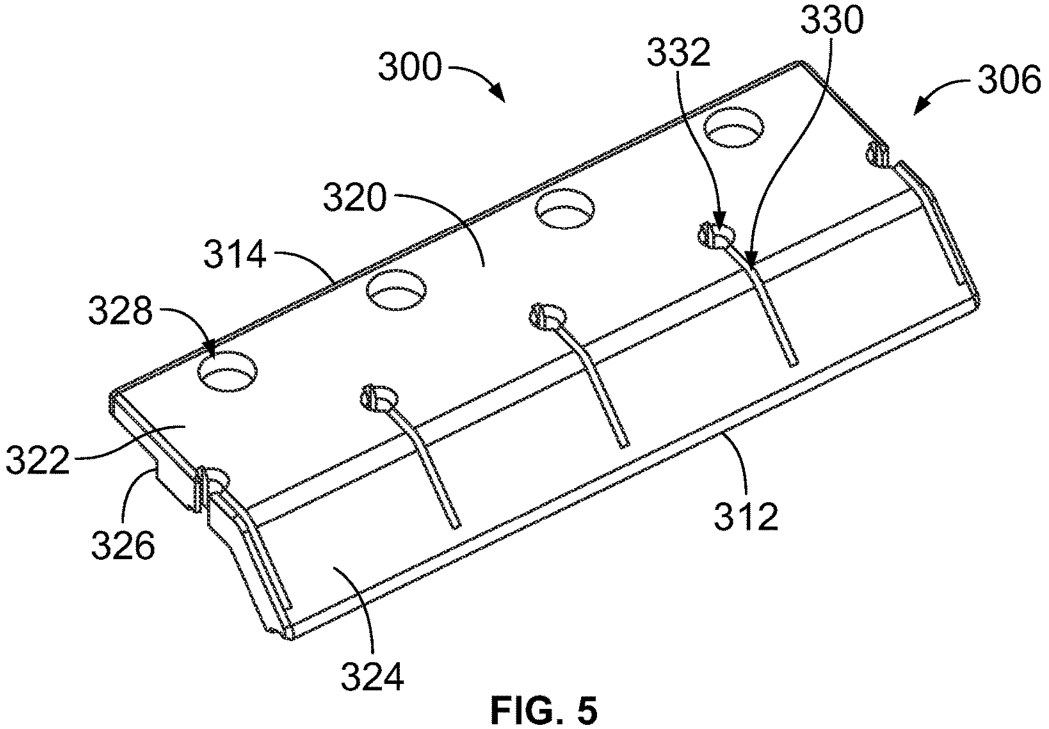
FIG. 5 is a perspective view of a portion of the ground bus showing the outer bus member in accordance with an exemplary embodiment.

FIG. 5 is a perspective view of a portion of the ground bus 300 showing the outer bus member 306 in accordance with an exemplary embodiment. The outer bus member 306 extends between the front 312 and the rear 314. The outer bus member 306 is manufactured from a conductive material, such as a metal material. In various embodiments, the outer bus member 306 is a diecast member. In other various embodiments, the outer bus member 306 may be stamped and formed or a plated plastic member. The outer bus member 306 is configured to provide shielding for the cables 104 (shown in FIG. 4) and the contact assembly 200 (shown in FIG. 4).

Figure 6:
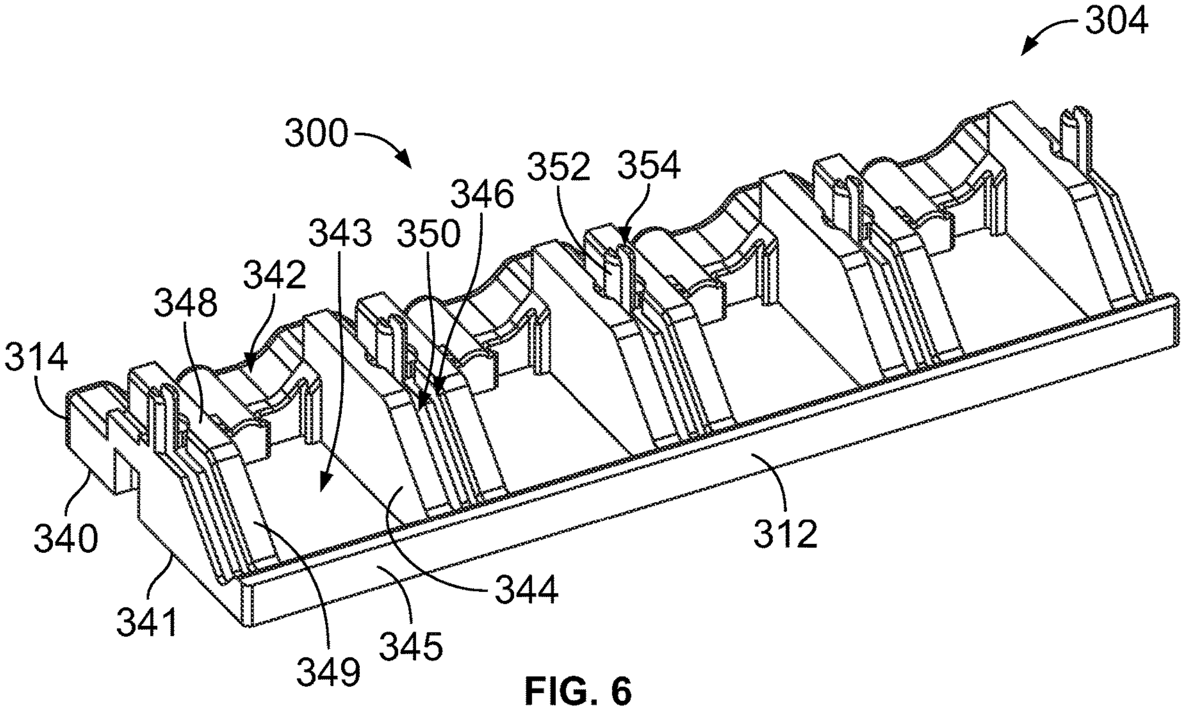
FIG. 6 is a perspective view of a portion of the ground bus showing the inner bus member in accordance with an exemplary embodiment.

The outer bus member 306 includes a cover 320 having an upper wall 322 and a front wall 324. The front wall 324 may be an angled wall, such as being angled relative to the upper wall 322, such as at an angle between 30° and 60°. In an exemplary embodiment, the outer bus member 306 includes locating ribs 326 extending from the bottom of the cover 320. The locating ribs 326 are used for positioning and/or shielding between the outer bus member 306 and the inner bus member 304 (FIG. 6). The locating ribs 326 extend from the upper wall 322 and/or the front wall 324. In an exemplary embodiment, the cover 320 includes openings 328 in the upper wall 322. The openings 328 are used to solder or laser welded the cover 320 to the cable shields 160 (shown in FIG. 4) of the cables 104 (shown in FIG. 4).

In an exemplary embodiment, the outer bus member 306 includes outer slots 330 configured to receive the ground blades 400 (shown in FIG. 3). The outer slots 330 may pass entirely through the outer bus member 306 to receive the ground blades 400. In various embodiments, the outer slots 330 may only be open at the bottom of the outer bus member 306. In an exemplary embodiment, the outer slots 330 are aligned with the locating ribs 326. For example, the outer slots 330 may be centered on the locating ribs 326. The outer slots 330 pass through the cover 320 and pass through the locating ribs 326. Optionally, the outer bus member 306 may include protrusions extending into the outer slots 330, such as to engage the ground blades 400 to electrically connect the ground blades 400 to the outer bus member 306. For example, the protrusions may be bulges, tabs, spring beams, or other types of protrusions.

In an exemplary embodiment, the outer bus member 306 includes locating openings 332. The locating openings 332 are configured to interface with portions of the inner bus member 304 (shown in FIG. 2) to locate the outer bus member 306 relative to the inner bus member 304. For example, the locating openings 332 may receive locating pins or other features of the inner bus member 304 to align the outer bus member 306 with the inner bus member 304. The locating openings 332 may pass entirely through the outer bus member 306. In an exemplary embodiment, the locating openings 332 are aligned with the locating ribs 326. For example, the locating openings 332 may be centered on the locating ribs 326. The locating openings 332 pass through the cover 320 and pass through the locating ribs 326. In various embodiments, the locating openings 332 are open to the outer slots 330. For example, the outer slots 330 may extend from the locating openings 332. The ground blades 400 may be plugged into the locating openings 332.

FIG. 6 is a perspective view of a portion of the ground bus 300 showing the inner bus member 304 in accordance with an exemplary embodiment. The inner bus member 304 extends between the front 312 and the rear 314. The inner bus member 304 is manufactured from a conductive material, such as a metal material. In various embodiments, the inner bus member 304 is a diecast member. In other various embodiments, the inner bus member 304 may be a plated plastic member. The inner bus member 304 is configured to provide shielding for the cables 104 (shown in FIG. 4) and the contact assembly 200 (shown in FIG. 4).

The inner bus member 304 includes a base 340 having a bottom 341 configured to be mounted to the circuit card 132 (shown in FIG. 3). The base 340 includes cable cradles 342 configured to receive corresponding cables 104. The cable cradles 342 support the cables 104 for termination to the contact assembly 200. In an exemplary embodiment, the base 340 includes pockets 343 that receive corresponding contact blocks 212 (shown in FIG. 4) and the signal contacts 250 (shown in FIG. 4). The base 340 includes separating walls 344 between the pockets 343. Optionally, the separating walls 344 may be connected by a front wall 345 at the front of the inner bus member 304. The front wall 345 is located forward of the pockets 343. The front wall 345 provides shielding for the signal contacts 250 in the pockets 343. The separating walls 344 provide shielding between the pockets 343 and the signal contacts 250 in the pocket 343. The separating walls 344 position the contact blocks 212 relative to each other. The separating walls 344 may be located between respective cable cradles 342. Each separating wall 344 includes an upper surface 348 supporting the upper wall 322 of the cover 320 (shown in FIG. 5) and a front surface 349 supporting the front wall 324 of the cover 320. The front surface 349 is angled relative to the upper surface 348, such as at an angle of between 30° and 60°. Optionally, the upper surface 348 may be oriented generally horizontally and the front surface 349 may be angled at approximately 45° relative to the upper surface 348.

In an exemplary embodiment, the inner bus member 304 includes locating grooves 346 extending along the separating walls 344. The locating grooves 346 are used for positioning and/or shielding between the outer bus member 306 (shown in FIG. 5) and the inner bus member 304. The locating grooves 346 be approximately centered along the separating walls 344 between the pockets 343. The locating grooves 346 may extend inward from the upper surface 348 and/or from the front surface 349. The locating grooves 346 are sized and shaped to receive the locating ribs 326 (shown in FIG. 5).

In an exemplary embodiment, the inner bus member 304 includes inner slots 350 configured to receive the ground blades 400 (shown in FIG. 3). The inner slots 350 may pass entirely through the inner bus member 304 to receive the ground blades 400, allowing the ground blades 400 to be connected to the circuit card 132. For example, the ground blades 400 may include compliant pins at the bottom configured to be press fit into plated vias in the circuit card 132 to electrically connect the ground blades 400 to the circuit card 132. In various embodiments, the inner slots 350 may only be open at the top of the inner bus member 304 to receive the ground blades 400 from above and have closed bottoms to support the ground blades 400 in the inner slots 350. In an exemplary embodiment, the inner slots 350 are aligned with the locating grooves 346. For example, the inner slots 350 may be centered on the locating grooves 346. Optionally, the inner bus member 304 may include protrusions extending into the inner slots 350, such as to engage the ground blades 400 to electrically connect the ground blades 400 to the inner bus member 304. For example, the protrusions may be bulges, tabs, spring beams, or other types of protrusions.

In an exemplary embodiment, the inner bus member 304 includes locating pins 352 extending from the separating walls 344. The locating pins 352 may extend upward from the upper surfaces 348 of the separating walls 344. The locating pins 352 are configured to interface with the outer bus member 306 to locate the outer bus member 306 relative to the inner bus member 304. For example, the locating pins 352 may be received in the locating openings 332 (shown in FIG. 5) to align the outer bus member 306 with the inner bus member 304. The locating pins 352 may be press-fit into the outer bus member 306 to mechanically and electrically connect the outer bus member 306 to the inner bus member 304. In an exemplary embodiment, the locating pins 352 include pins slots 354 passing through the locating pins 352. The pin slots 354 are configured to receive the ground blades 400. When the ground blades 400 are received in the pin slots 354, the locating pins 352 may be spread outward to lock the locating pins 352 in the locating openings 332. In an exemplary embodiment, the locating pins 352 are aligned with the locating grooves 346. For example, the locating pins 352 may be centered on the locating grooves 346. In an exemplary embodiment, the ground blades 400 are plugged into the locating pins 352.

Figure 7:
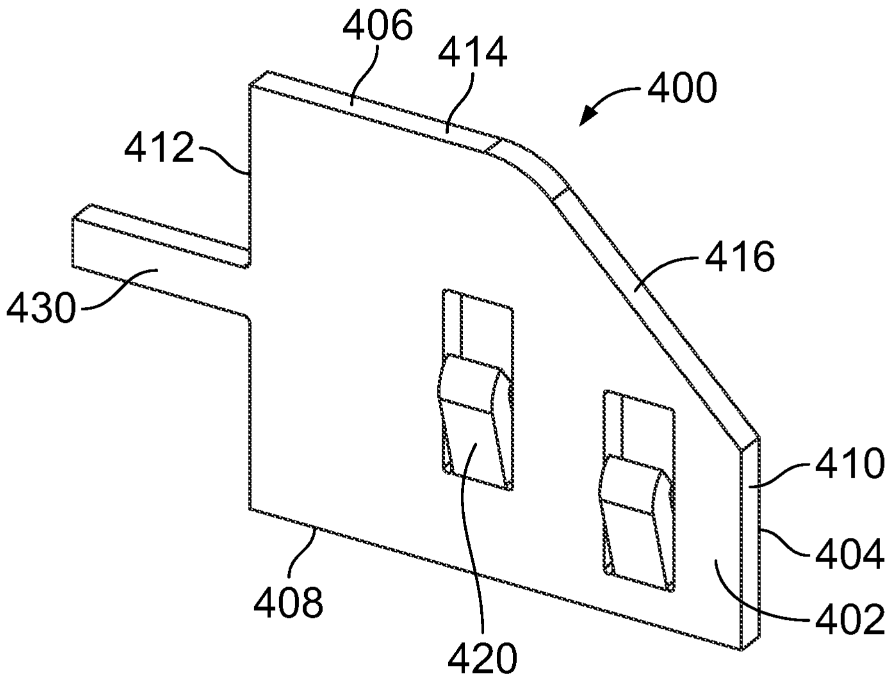
FIG. 7 is a perspective view of the ground blade in accordance with an exemplary embodiment.
Figure 8:
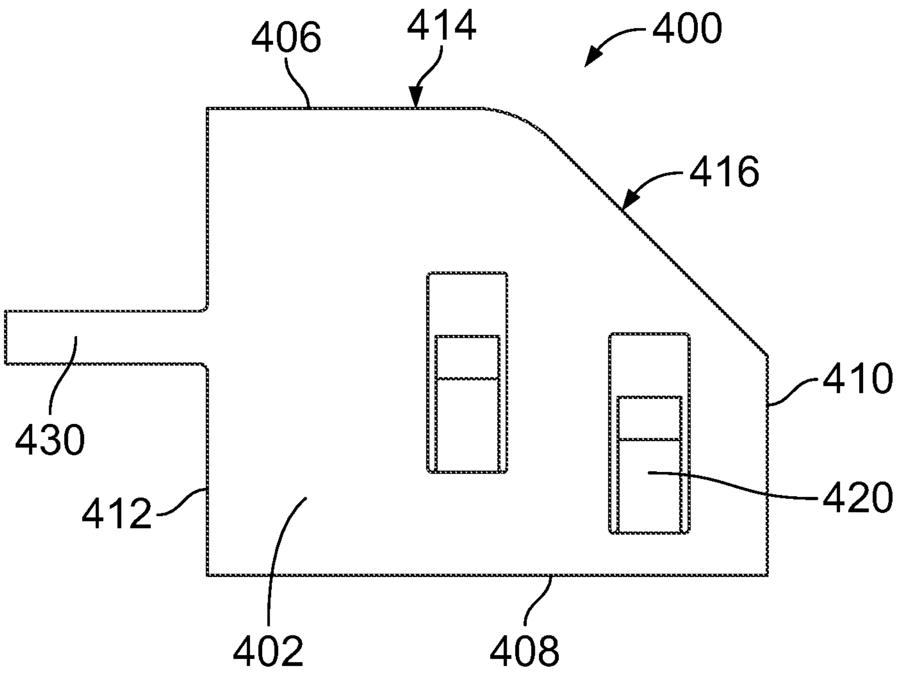
FIG. 8 is a side view of the ground blade in accordance with an exemplary embodiment.

FIG. 7 is a perspective view of the ground blade 400 in accordance with an exemplary embodiment. FIG. 8 is a side view of the ground blade 400 in accordance with an exemplary embodiment. In an exemplary embodiment, the ground blade 400 is a conductive element configured to electrically connect the inner bus member 304 (shown in FIG. 3) and the outer bus member 306 (shown in FIG. 3). The ground blade 400 may be manufactured from a metal material, such as copper, aluminum, steel, and the like. In an exemplary embodiment, the ground blade 400 is a stamped and formed part stamped from a metal sheet.

In an exemplary embodiment, the ground blade 400 is generally planar having a first side 402 and a second side 404. The ground blade 400 extends between a top 406 and a bottom 408. The ground blade 400 has a front 410 and a rear 412. The ground blade 400 is sized and shaped to fit in the inner bus member 304 (shown in FIG. 3) and the outer bus member 306 (shown in FIG. 3). For example, the ground blade 400 may be received in the inner slots 350 (shown in FIG. 6) and outer slots 330 (shown in FIG. 5) of the inner bus member 304 and the outer bus member 306, respectively. In various embodiments, the front 410 is planar and oriented vertically. The rear 412 may be planar and oriented vertically. The bottom 408 may be planar and oriented horizontally. In the illustrated embodiment, the top 406 includes an upper portion 414 that is oriented horizontally and an angled portion 416 that is angled between the upper portion 414 and the front 410. The ground blade 400 may have other shapes in alternative embodiments.

In an exemplary embodiment, the ground blade 400 includes one or more shell termination elements 420 configured to be electrically connected to the shell 302 (shown in FIG. 3), such as the inner bus member 304 and/or the outer bus member 306. The shell termination elements 420 may extend from the first side 402 and/or the second side 404. In the illustrated embodiment, the shell termination elements 420 are spring beams stamped from the main body of the ground blade 400. The shell termination elements 420 are deflectable and configured to be deflected when engaging the shell 302. The shell termination elements 420 define points of contact with the shell 302 to electrically connect the ground blade 400 to the shell 302. In the illustrated embodiment, a pair of the shell termination elements 420 are provided. Greater or fewer shell termination elements 420 may be provided in alternative embodiments. The shell termination elements 420 may take other forms in alternative embodiments, such as being bulges, tabs, or other types of protrusions extending from the ground blade 400.

In an exemplary embodiment, the ground blade 400 includes one or more drain wire terminators 430 configured to be terminated to the drain wires 164 of the cable 104 (shown in FIG. 4). In the illustrated embodiment, the drain wire terminator 430 extends from the rear 412 of the ground blade 400. The drain wire terminator 430 may be approximately centered between the top 406 and the bottom 408. The drain wire terminator 430 may include one or more surfaces forming a pad configured to be welded or soldered to the drain wires 164. For example, the drain wires 164 may be connected to the top and/or the bottom and/or either side of the drain wire terminator 430. Other types of drain wire terminators may be provided in alternative embodiments such as compression connections, crimp connections, insulation displacement connections, and the like.

Figure 9:
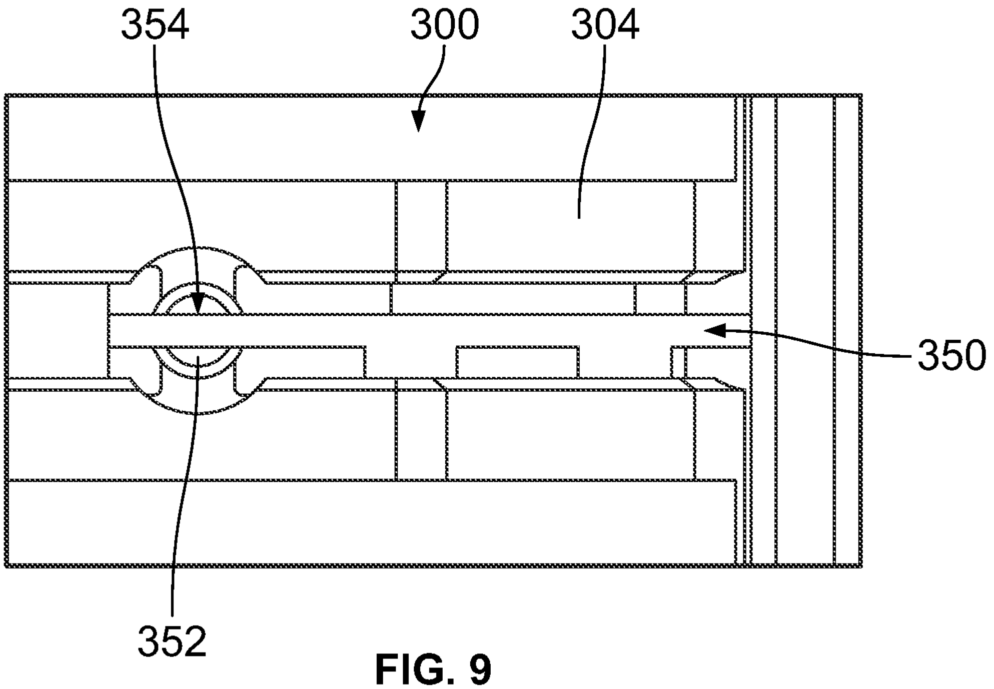
FIG. 9 is a top view of a portion of the ground bus showing the inner bus member without the ground blade in accordance with an exemplary embodiment.
Figure 10:
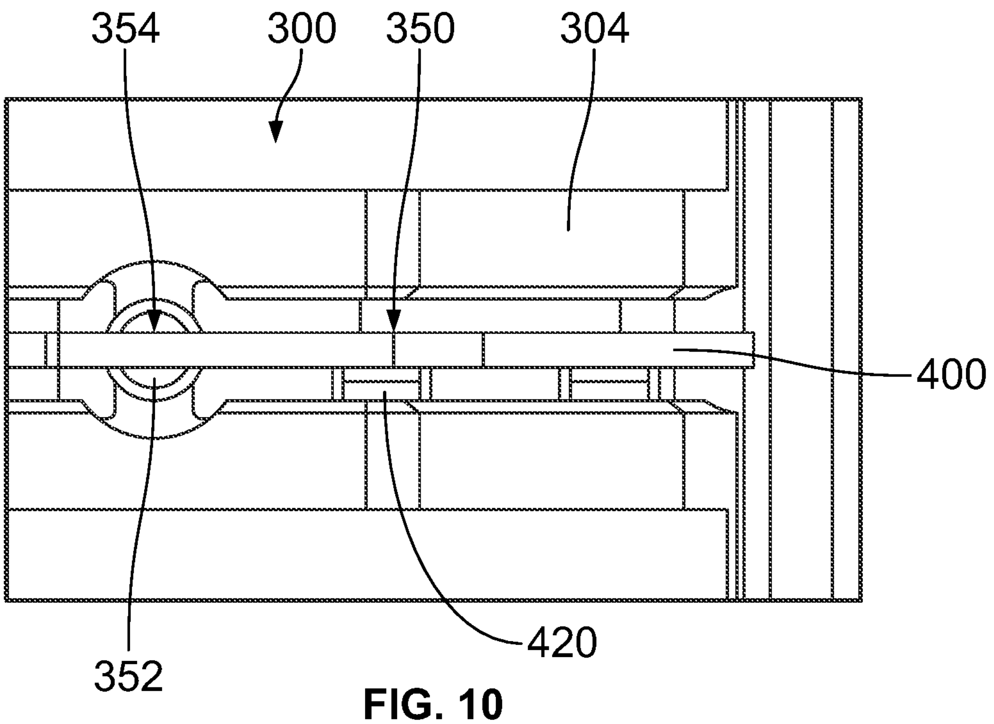
FIG. 10 is a top view of a portion of the ground bus showing the inner bus with the ground blade coupled thereto in accordance with an exemplary embodiment.

FIG. 9 is a top view of a portion of the ground bus 300 showing the inner bus member 304 without the ground blade 400. FIG. 10 is a top view of a portion of the ground bus 300 showing the inner bus member 304 with the ground blade 400 coupled thereto. The ground blade 400 is configured be received in the inner slot 350. For example, the ground blade 400 may be loaded into the inner slot 350 from above. When plugged into the inner slot 350, the ground blade 400 is electrically connected to the inner bus member 304. For example, the shell termination element 420 engages the inner bus member 304 in the inner slot 350. In an exemplary embodiment, the inner slot 350 passes through the locating pins 352 forming pin slot 354. The ground blade 400 is configured be received in the pin slot 354 of the locating pins 352 and the inner slot 350 of the inner bus member 304.

Figure 11:
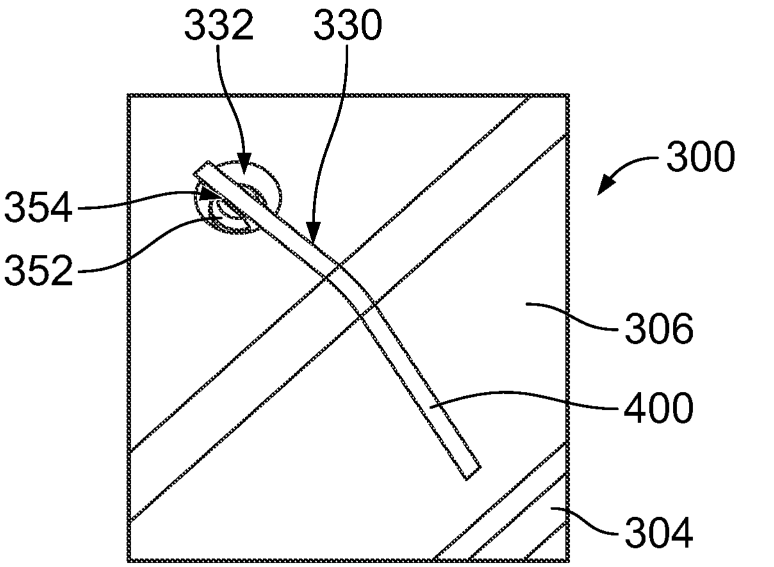
FIG. 11 is a top perspective view of a portion of the ground bus showing the ground blade received in the outer bus member in accordance with an exemplary embodiment.

FIG. 11 is a top perspective view of a portion of the ground bus 300 showing the ground blade 400 received in the outer bus member 306. The ground blade 400 is configured be received in the outer slot 330. For example, the ground blade 400 may be loaded into the outer slot 330 from above. When plugged into the outer slot 330, the ground blade 400 is electrically connected to the outer bus member 306. The ground blade 400 electrically connects the outer bus member 306 and the inner bus member 304.

In an exemplary embodiment, when the outer bus member 306 is coupled to the inner bus member 304, the locating pins 352 are received in the locating openings 332. The locating pins 352 may be mechanically and electrically connected to the outer bus member 306 to couple the outer bus member 306 to the inner bus member 304. In an exemplary embodiment, the ground blade 400 is received in the pin slot 354 when the ground blade 400 is plugged into the outer slot 330 and the inner slot 350 (shown in FIG. 9). The ground blade 400 may expand the locating pins 352 when plugged into the locating pins 352 causing the locating pins 352 to expand outward and lock in the locating opening 332. When the locating pins 352 is expanded outward, the locating pins 352 may be deflected outward into mechanical and electrical connection with the outer bus member 306.

Figure 12:
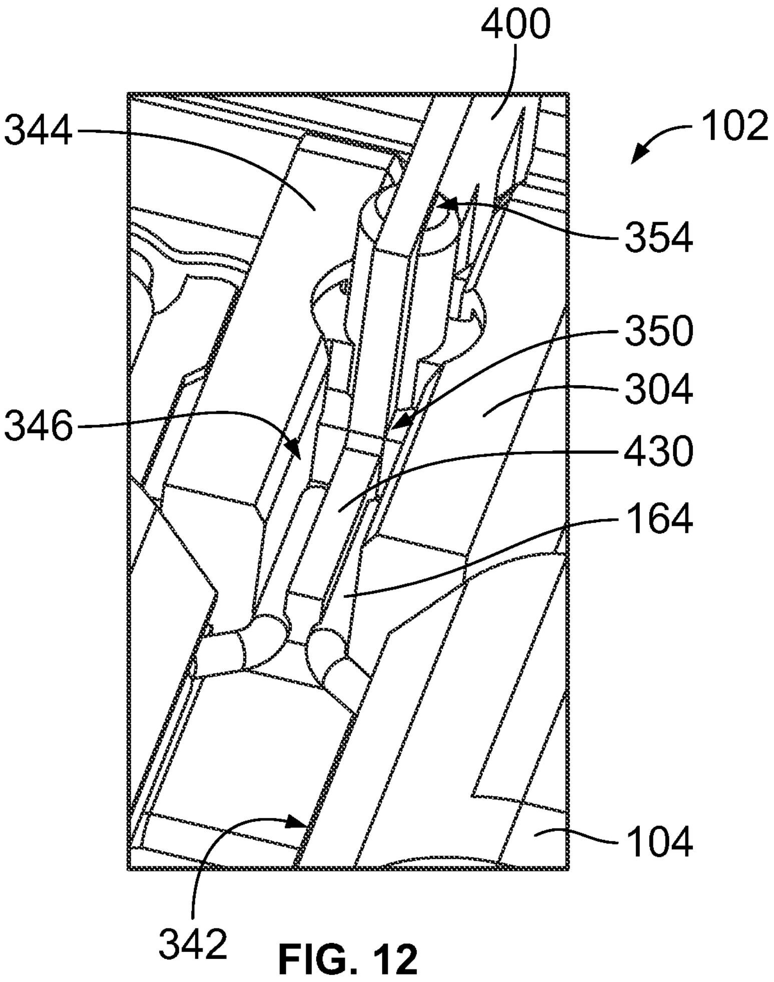
FIG. 12 is a top perspective view of a portion of the electrical connector showing the ground blade connected to the drain wires of the cables in accordance with an exemplary embodiment.

FIG. 12 is a top perspective view of a portion of the electrical connector 102 showing the ground blade 400 connected to the drain wires 164 of the cables 104. The outer bus member 306 is removed to illustrate the ground blade 400, the inner bus member 304, and the cables 104. The ground blade 400 is shown in the inner slot 350 and the pin slot 354.

The ground blade 400 is located in the inner slot 350 in the separating wall 344. The drain wire terminator 430 is located at the rear of the ground blade 400 and extends toward the cable cradles 342. The drain wires 164 extend along the drain wire terminator 430. For example, the drain wires 164 are received in the locating groove 346 to interface with the drain wire terminator 430. The drain wires 164 may be soldered or welded to the drain wire terminator 430. The drain wires 164 may additionally be electrically coupled to the inner bus member 304, such as to the separating wall 344.

Figure 13:
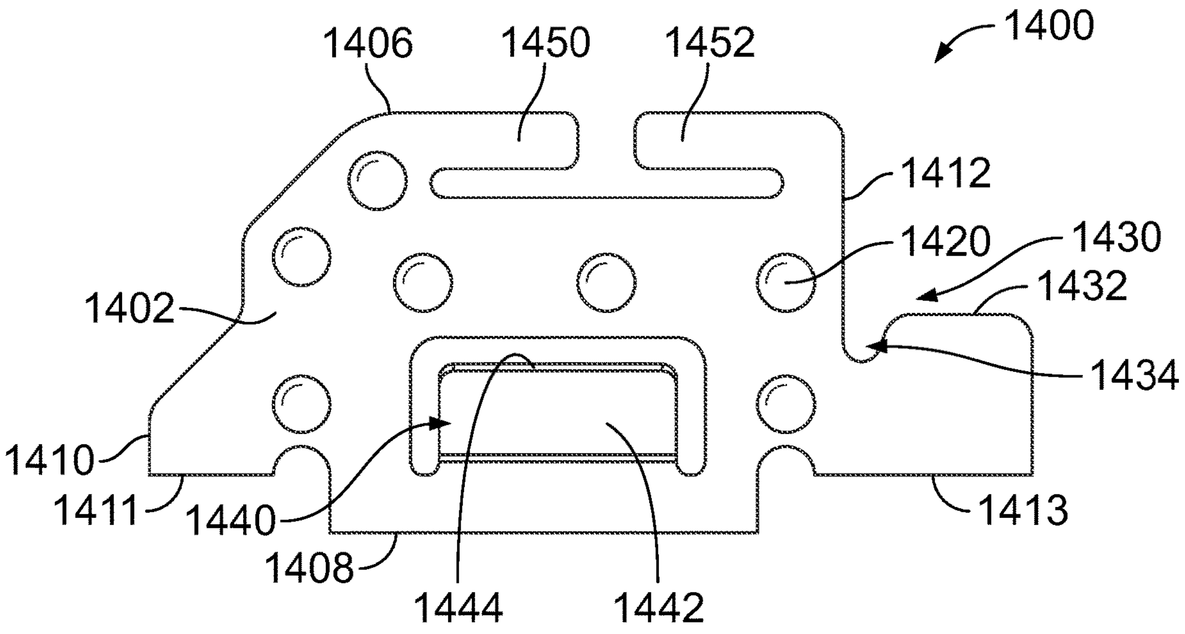
FIG. 13 is a side view of a ground blade in accordance with an exemplary embodiment.
Figure 14:
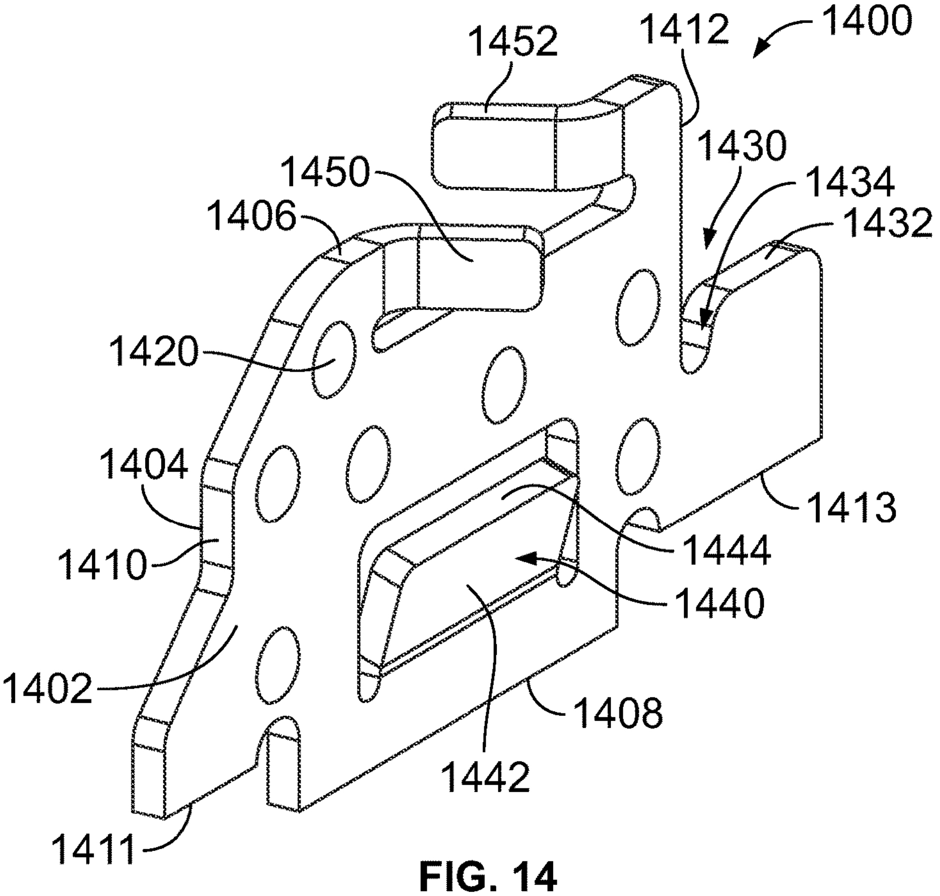
FIG. 14 is a perspective view of the ground blade in accordance with an exemplary embodiment.

FIG. 13 is a side view of a ground blade 1400 in accordance with an exemplary embodiment. FIG. 14 is a perspective view of the ground blade 1400 in accordance with an exemplary embodiment. The ground blade 1400 may be used in place of the ground blade 400 (FIGS. 7 and 8) with modifications to the ground bus 300 to accommodate the differently shaped ground blade 1400. In an exemplary embodiment, the ground blade 1400 is a conductive element configured to electrically connect the inner bus member 304 (shown in FIG. 3) and the outer bus member 306 (shown in FIG. 3). The ground blade 1400 may be manufactured from a metal material, such as copper, aluminum, steel, and the like. In an exemplary embodiment, the ground blade 1400 is a stamped and formed part stamped from a metal sheet.

In an exemplary embodiment, the ground blade 1400 is generally planar having a first side 1402 and a second side 1404. The ground blade 1400 extends between a top 1406 and a bottom 1408. The ground blade 1400 has a front 1410 and a rear 1412. The ground blade 1400 is sized and shaped to fit in the inner bus member 304 and the outer bus member 306, such as in the corresponding inner slots 350 (shown in FIG. 6) and outer slots 330 (shown in FIG. 5) of the inner bus member 304 and the outer bus member 306, respectively. In various embodiments, the ground blade 1400 includes front and rear supports 1411, 1413 at the front 1410 and the rear 1412, respectively. The front and rear supports 1411, 1413 are configured to abut against the inner bus member 304 to support the ground blade 1400 in the inner slot 350 of the inner bus member 304. The ground blade 1400 may have other shapes in alternative embodiments.

In an exemplary embodiment, the ground blade 1400 includes one or more shell termination elements 1420 configured to be electrically connected to the shell 302 (shown in FIG. 3), such as the inner bus member 304 and/or the outer bus member 306. The shell termination elements 1420 may extend from the first side 1402 and/or the second side 1404. In the illustrated embodiment, the shell termination elements 1420 are protrusions or bumps extending from the main body of the ground blade 1400. The shell termination elements 1420 define points of contact with the shell 302 to electrically connect the ground blade 1400 to the shell 302. In the illustrated embodiment, the shell termination elements 1420 are spaced relatively close to each other, such as less than approximately 1 mm apart. Other spacings may be used in alternative embodiments. The shell termination elements 1420 may take other forms in alternative embodiments, such as being bulges, tabs, spring beams or other types of protrusions extending from the ground blade 1400.

Figure 20:
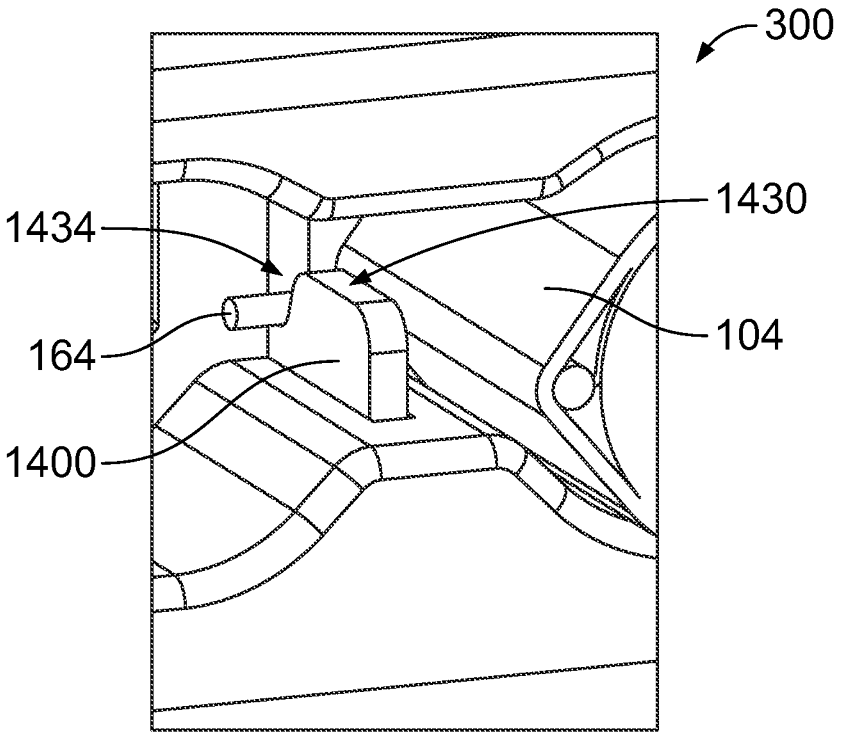
FIG. 20 is a rear view of a portion of the ground bus showing the drain wire coupled to the ground blade.

In an exemplary embodiment, the ground blade 1400 includes one or more drain wire terminators 1430 configured to be terminated to the drain wires 164 of the cable 104 (shown in FIG. 20). In the illustrated embodiment, the drain wire terminator 1430 extends from the rear 1412 of the ground blade 1400. The drain wire terminator 1430 may be approximately centered between the top 1406 and the bottom 1408. The drain wire terminator 1430 may include one or more surfaces forming a pad 1432 configured to be welded or soldered to the drain wires 164. For example, the drain wires 164 may be connected to the top and/or the bottom and/or either side of the drain wire terminator 1430. The drain wire terminator 1430 may include one or more slots 1434 configured to receive the drain wires 164. Other types of drain wire terminators may be provided in alternative embodiments such as compression connections, crimp connections, insulation displacement connections, and the like.

In an exemplary embodiment, the ground blade 1400 includes one or more inner connection elements 1440 configured to be connected to the inner bus member 304 of the shell 302. The inner connection element 1440 may extend from the first side 1402 and/or the second side 1404. In the illustrated embodiment, the inner connection element 1440 may include a latch or tab 1442 configured to be latchably coupled to the inner bus member 304. For example, an edge 1444 of the tab 1442 may be coupled to the inner bus member 304. The inner connection element 1440 may take other forms in alternative embodiments.

In an exemplary embodiment, the ground blade 1400 includes one or more outer connection elements 1450 configured to be connected to the outer bus member 306 of the shell 302. The outer connection elements 1450 may extend from the first side 1402 and/or the second side 1404. In the illustrated embodiment, the outer connection elements 1450 may include latches or tabs 1452 configured to be coupled to the outer bus member 306. In the illustrated embodiment, the outer connection elements 1450 extend in opposite directions. The outer connection elements 1450 may take other forms in alternative embodiments.

Figure 15:
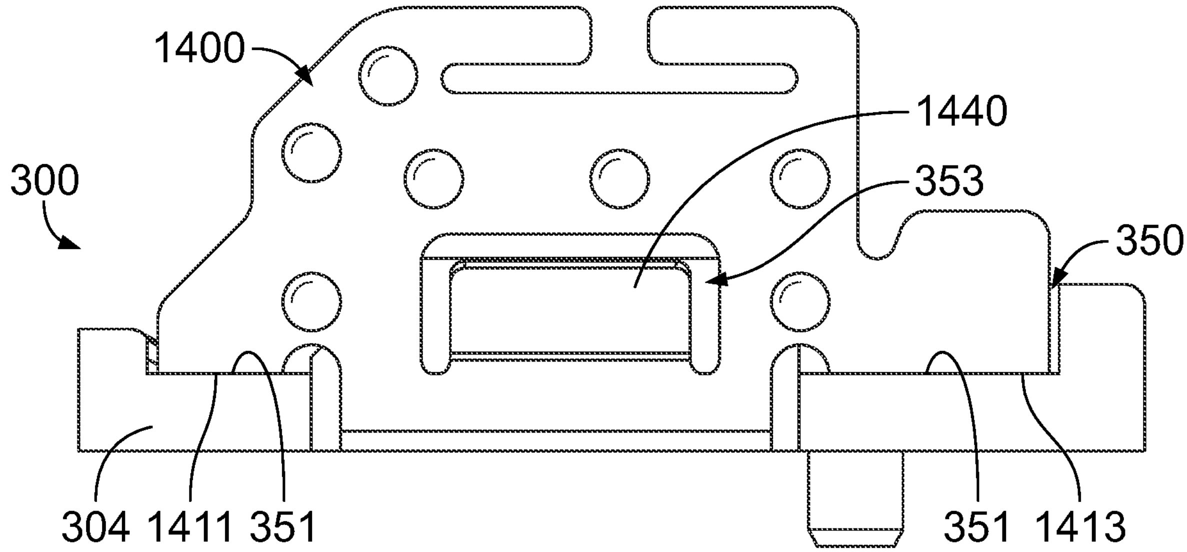
FIG. 15 is a side view of a portion of the ground bus showing the inner bus member with the ground blade coupled thereto.

FIG. 15 is a side view of a portion of the ground bus 300 showing the inner bus member 304 with the ground blade 1400 coupled thereto. The ground blade 1400 is received in the inner slot 350 of the inner bus member 304. For example, the ground blade 1400 may be loaded into the inner slot 350 from above. The front and rear supports 1411, 1413 of the ground blade 1400 are seated on corresponding front and rear lands 351 of the inner bus member 304. When plugged into the inner slot 350, the inner connection element 1440 of the ground blade 1400 is received in a pocket 353 of the inner slot 350 to secure the ground blade 1400 in the inner slot 350 of the inner bus member 304.

Figure 16:
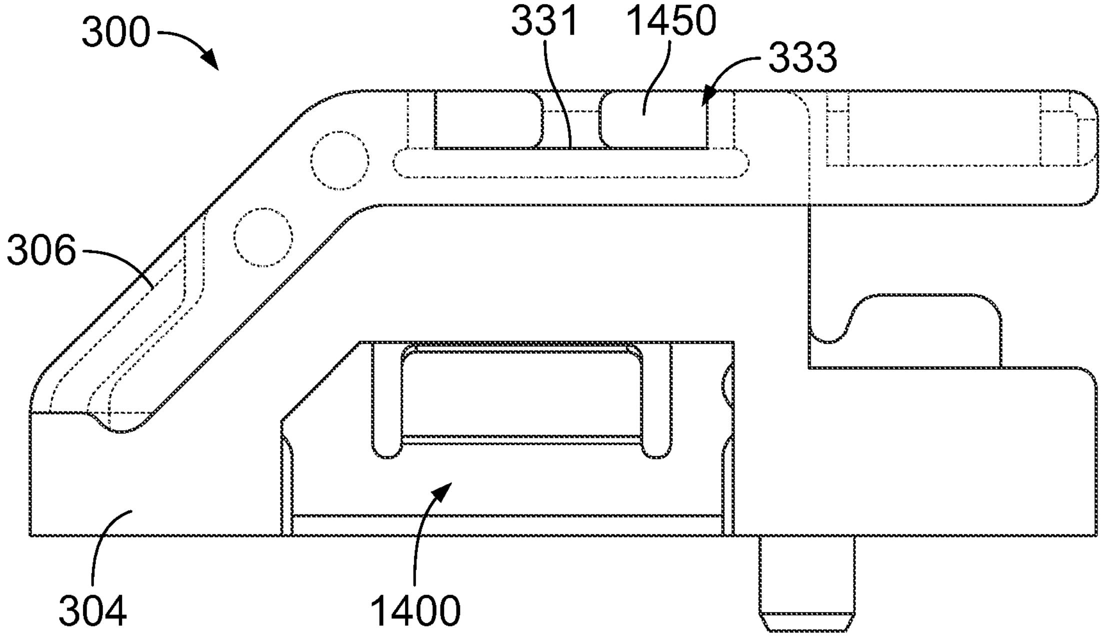
FIG. 16 is a side view of a portion of the ground bus showing the ground blade coupled to the inner and outer bus members.
Figure 17:
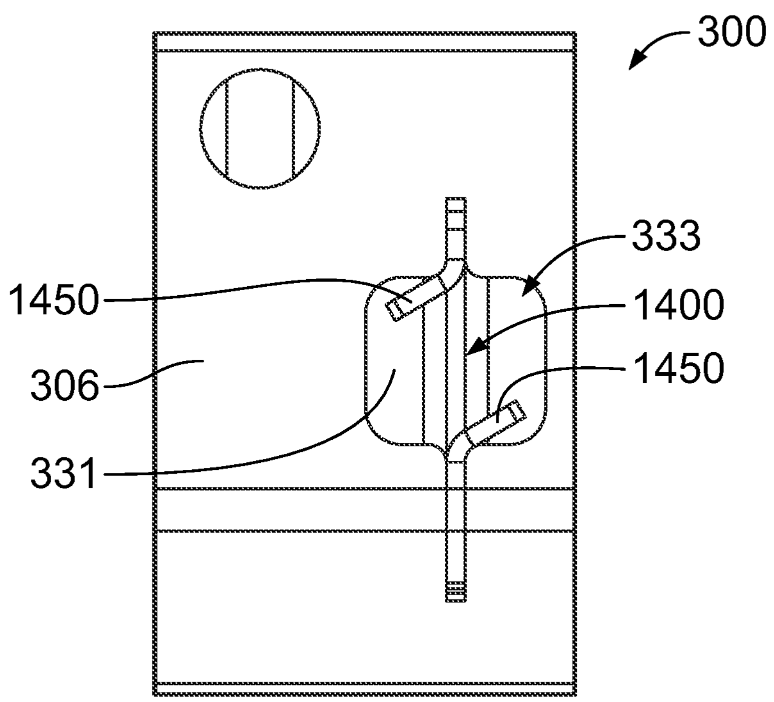
FIG. 17 is a top view of a portion of the ground bus showing the ground blade coupled to the outer bus member.
Figure 18:
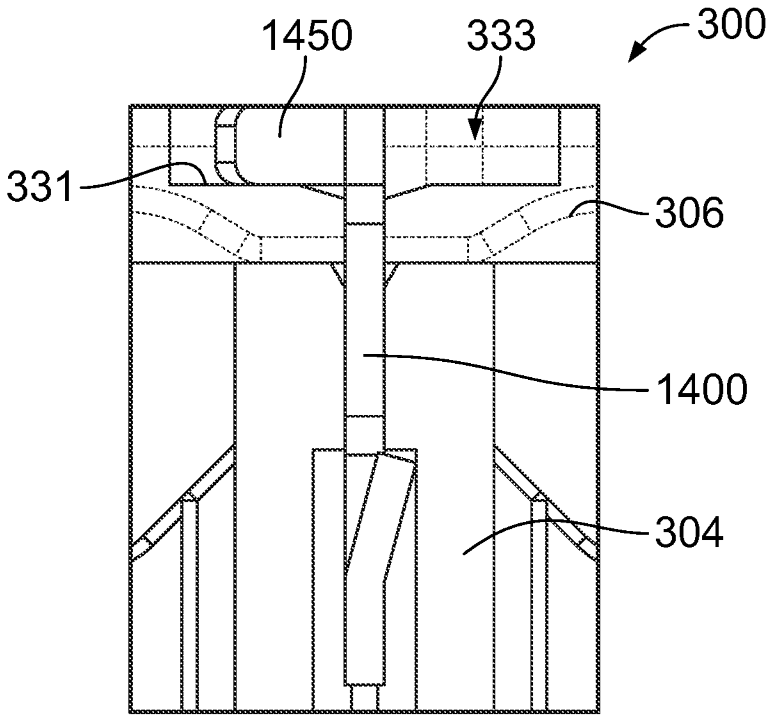
FIG. 18 is a front view of a portion of the ground bus showing the ground blade coupled to the inner and outer bus members.

FIG. 16 is a side view of a portion of the ground bus 300 showing the ground blade 1400 coupled to the inner and outer bus members 304, 306. FIG. 17 is a top view of a portion of the ground bus 300 showing the ground blade 1400 coupled to the outer bus member 306. FIG. 18 is a front view of a portion of the ground bus 300 showing the ground blade 1400 coupled to the inner and outer bus members 304, 306. After the outer bus member 306 is coupled to the inner bus member 304 and the ground blade 1400, the outer connection elements 1450 are bent to the right and/or the left into a pocket 333 of the outer bus member 306 to engage a retention surface 331 of the outer bus member and retain the outer bus member 306 on the inner bus member 304. For example, the outer connection element 1450 may prevent lift off or removal of the outer bus member 306 from the inner bus member 304.

Figure 19:
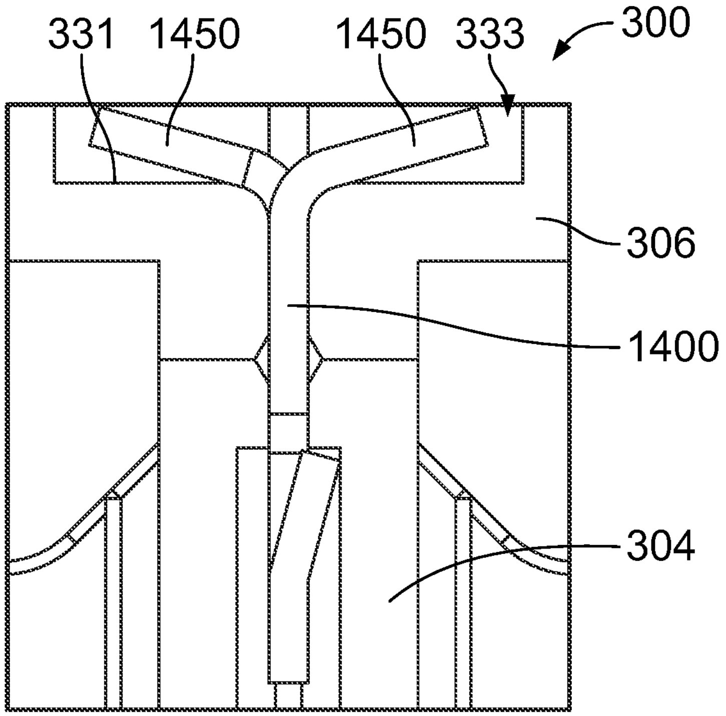
FIG. 19 is a front view of a portion of the ground bus showing the ground blade coupled to the inner and outer bus members.

FIG. 19 is a front view of a portion of the ground bus 300 showing the ground blade 1400 coupled to the inner and outer bus members 304, 306. In the illustrated embodiment, the outer connection elements 1450 are shaped differently than the embodiment of FIG. 18. For example, after the outer bus member 306 is coupled to the inner bus member 304 and the ground blade 1400, the outer connection elements 1450 are bent downward into the pocket 333 to engage the retention surface 331 of the outer bus member 306 and retain the outer bus member 306 on the inner bus member 304.

FIG. 20 is a rear view of a portion of the ground bus 300 showing the drain wire 164 coupled to the ground blade 1400. The drain wire 164 is received in the slot 1434 of the drain wire terminator 1430. The drain wire 164 may be soldered or welded to the ground blade 1400.

Figure 21:
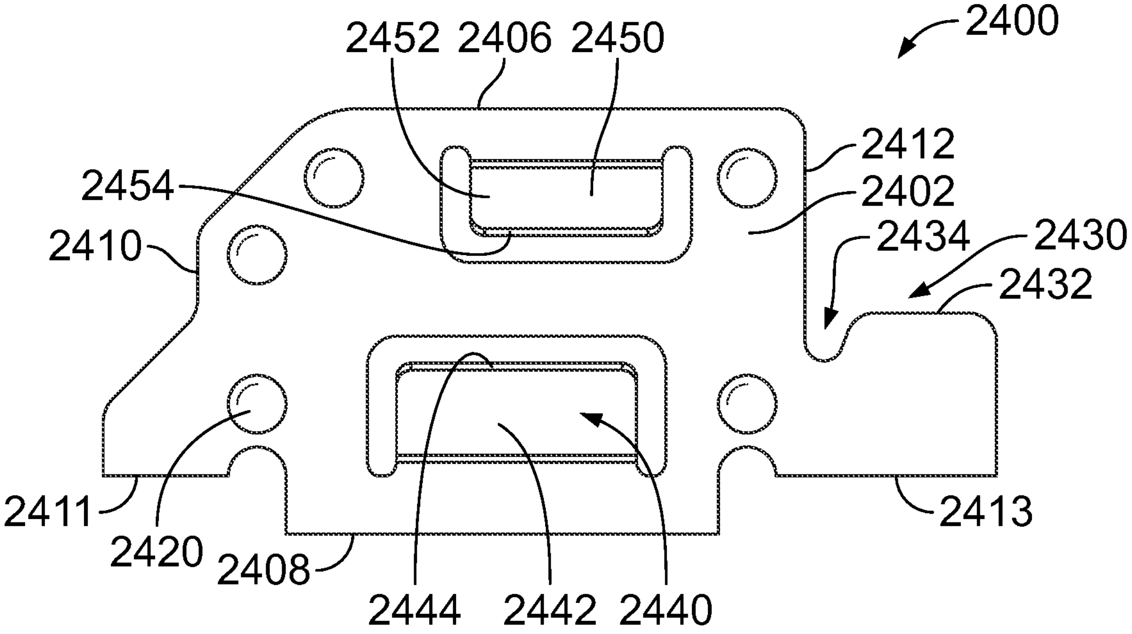
FIG. 21 is a side view of a ground blade in accordance with an exemplary embodiment.
Figure 22:
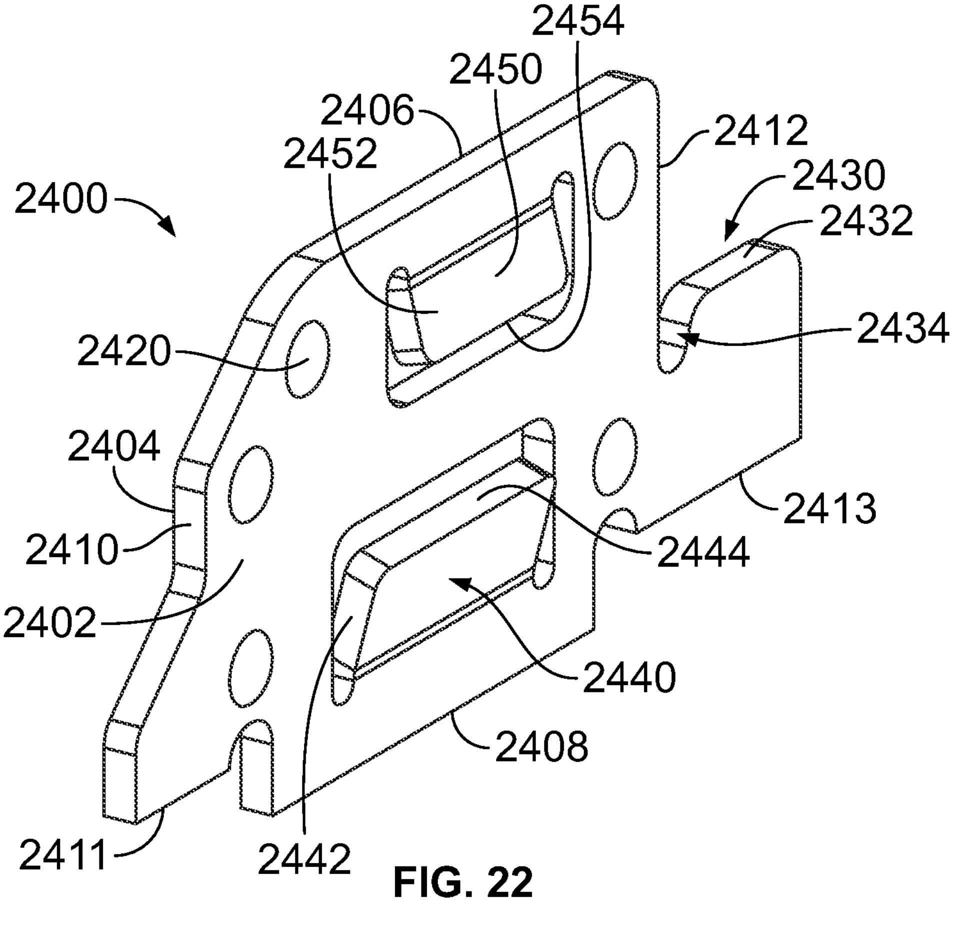
FIG. 22 is a perspective view of the ground blade in accordance with an exemplary embodiment.

FIG. 21 is a side view of a ground blade 2400 in accordance with an exemplary embodiment. FIG. 22 is a perspective view of the ground blade 2400 in accordance with an exemplary embodiment. The ground blade 2400 may be used in place of the ground blade 400 (FIGS. 7 and 8) with modifications to the ground bus 300 to accommodate the differently shaped ground blade 2400. In an exemplary embodiment, the ground blade 2400 is a conductive element configured to electrically connect the inner bus member 304 (shown in FIG. 3) and the outer bus member 306 (shown in FIG. 3). The ground blade 2400 may be manufactured from a metal material, such as copper, aluminum, steel, and the like. In an exemplary embodiment, the ground blade 2400 is a stamped and formed part stamped from a metal sheet.

In an exemplary embodiment, the ground blade 2400 is generally planar having a first side 2402 and a second side 2404. The ground blade 2400 extends between a top 2406 and a bottom 2408. The ground blade 2400 has a front 2410 and a rear 2412. The ground blade 2400 is sized and shaped to fit in the inner bus member 304 and the outer bus member 306, such as in the corresponding inner slots 350 (shown in FIG. 6) and outer slots 330 (shown in FIG. 5) of the inner bus member 304 and the outer bus member 306, respectively. In various embodiments, the ground blade 2400 includes front and rear supports 2411, 2413 at the front 2410 and the rear 2412, respectively. The front and rear supports 2411, 2413 are configured to abut against the inner bus member 304 to support the ground blade 2400 in the inner slot 350 of the inner bus member 304. The ground blade 2400 may have other shapes in alternative embodiments.

In an exemplary embodiment, the ground blade 2400 includes one or more shell termination elements 2420 configured to be electrically connected to the shell 302 (shown in FIG. 3), such as the inner bus member 304 and/or the outer bus member 306. The shell termination elements 2420 may extend from the first side 2402 and/or the second side 2404. In the illustrated embodiment, the shell termination elements 2420 are protrusions or bumps extending from the main body of the ground blade 2400. The shell termination elements 2420 define points of contact with the shell 302 to electrically connect the ground blade 2400 to the shell 302. In the illustrated embodiment, the shell termination elements 2420 are spaced relatively close to each other, such as less than approximately 1 mm apart. Other spacings may be used in alternative embodiments. The shell termination elements 2420 may take other forms in alternative embodiments, such as being bulges, tabs, spring beams or other types of protrusions extending from the ground blade 2400.

In an exemplary embodiment, the ground blade 2400 includes one or more drain wire terminators 2430 configured to be terminated to the drain wires 164 of the cable 104 (shown in FIG. 20). In the illustrated embodiment, the drain wire terminator 2430 extends from the rear 2412 of the ground blade 2400. The drain wire terminator 2430 may be approximately centered between the top 2406 and the bottom 2408. The drain wire terminator 2430 may include one or more surfaces forming a pad 2432 configured to be welded or soldered to the drain wires 164. For example, the drain wires 164 may be connected to the top and/or the bottom and/or either side of the drain wire terminator 2430. The drain wire terminator 2430 may include one or more slots 2434 configured to receive the drain wires 164. Other types of drain wire terminators may be provided in alternative embodiments such as compression connections, crimp connections, insulation displacement connections, and the like.

In an exemplary embodiment, the ground blade 2400 includes one or more inner connection elements 2440 configured to be connected to the inner bus member 304 of the shell 302. The inner connection element 2440 may extend from the first side 2402 and/or the second side 2404. In the illustrated embodiment, the inner connection element 2440 may include a latch or tab 2442 configured to be latchably coupled to the inner bus member 304. For example, an edge 2444 of the tab 2442 may be coupled to the inner bus member 304. The inner connection element 2440 may take other forms in alternative embodiments.

In an exemplary embodiment, the ground blade 2400 includes one or more outer connection elements 2450 configured to be connected to the outer bus member 306 of the shell 302. The outer connection element 2450 may extend from the first side 2402 and/or the second side 2404. In the illustrated embodiment, the outer connection element 2450 may include a latch or tab 2452 configured to be latchably coupled to the outer bus member 306. For example, an edge 2454 of the tab 2452 may be coupled to the outer bus member 306. The outer connection element 2450 may take other forms in alternative embodiments.

Figure 23:
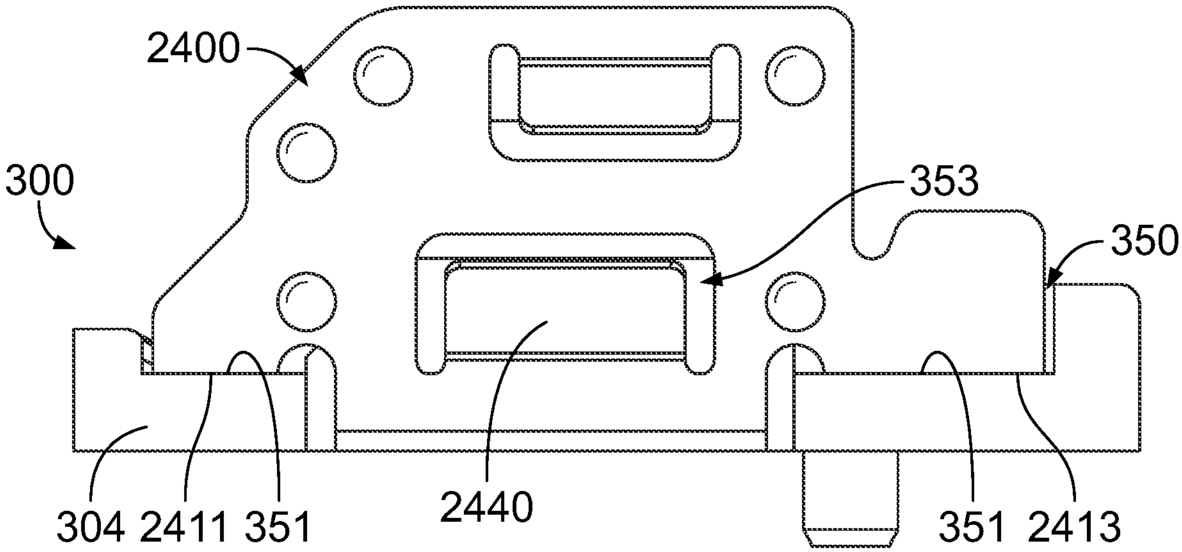
FIG. 23 is a side view of a portion of the ground bus showing the inner bus member with the ground blade coupled thereto.

FIG. 23 is a side view of a portion of the ground bus 300 showing the inner bus member 304 with the ground blade 2400 coupled thereto. The ground blade 2400 is received in the inner slot 350 of the inner bus member 304. For example, the ground blade 2400 may be loaded into the inner slot 350 from above. The front and rear supports 2411, 2413 of the ground blade 2400 are seated on corresponding front and rear lands 351 of the inner bus member 304. When plugged into the inner slot 350, the inner connection element 2440 of the ground blade 2400 is received in a pocket 353 of the inner slot 350 to secure the ground blade 2400 in the inner slot 350 of the inner bus member 304.

Figure 24:
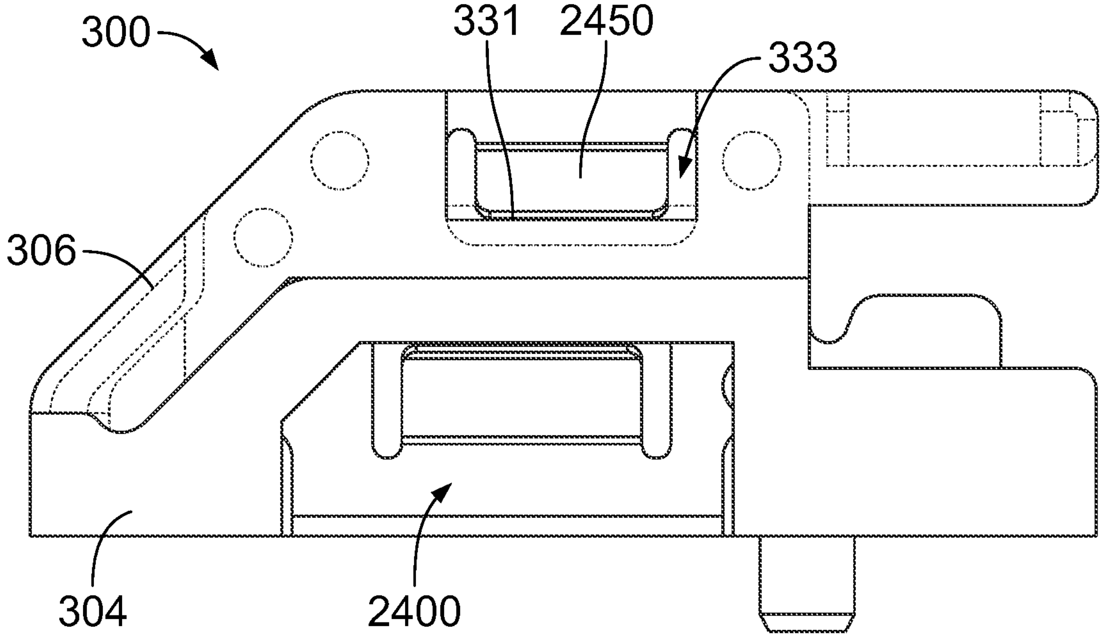
FIG. 24 is a side view of a portion of the ground bus showing the ground blade coupled to the inner and outer bus members.
Figure 25:
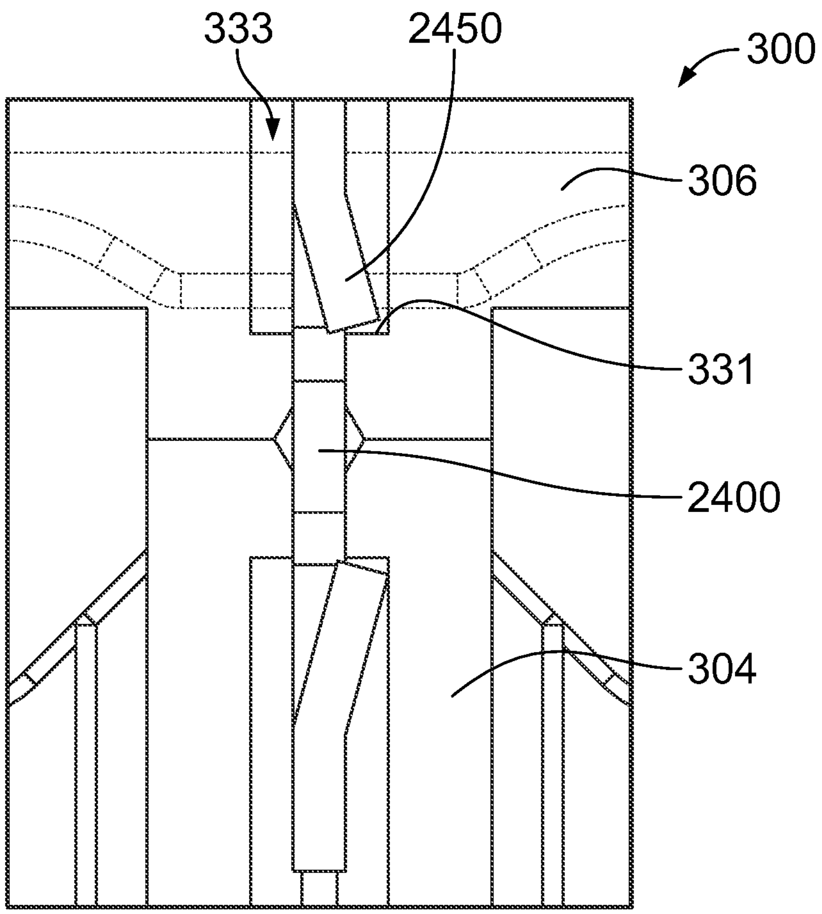
FIG. 25 is a front view of a portion of the ground bus showing the ground blade coupled to the inner and outer bus members.

FIG. 24 is a side view of a portion of the ground bus 300 showing the ground blade 2400 coupled to the inner and outer bus members 304, 306. FIG. 25 is a front view of a portion of the ground bus 300 showing the ground blade 2400 coupled to the inner and outer bus members 304, 306. After the outer bus member 306 is coupled to the inner bus member 304 and the ground blade 2400, the outer connection element 2450 is received in a pocket 333 of the outer bus member 306 to engage a retention surface 331 of the outer bus member 306 and retain the outer bus member 306 on the inner bus member 304. For example, the outer connection element 2450 may prevent lift off or removal of the outer bus member 306 from the inner bus member 304.

Figure 26:
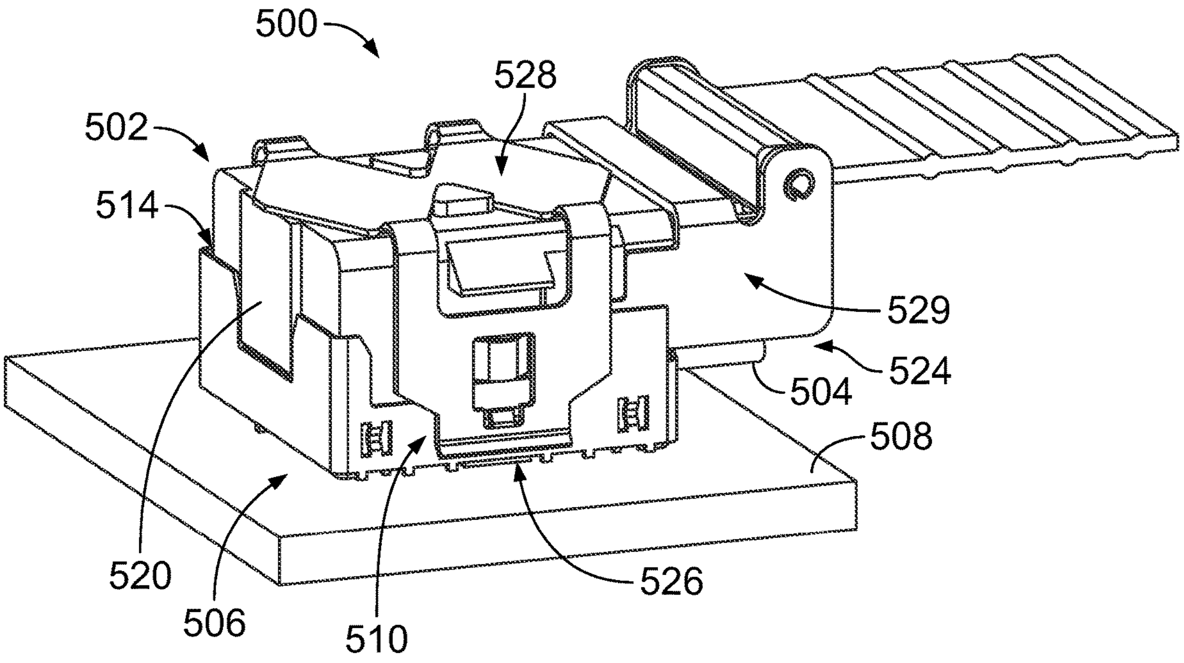
FIG. 26 is a perspective view of a communication system in accordance with an exemplary embodiment showing a first electrical connector and a second electrical connector in a mated state.
Figure 27:
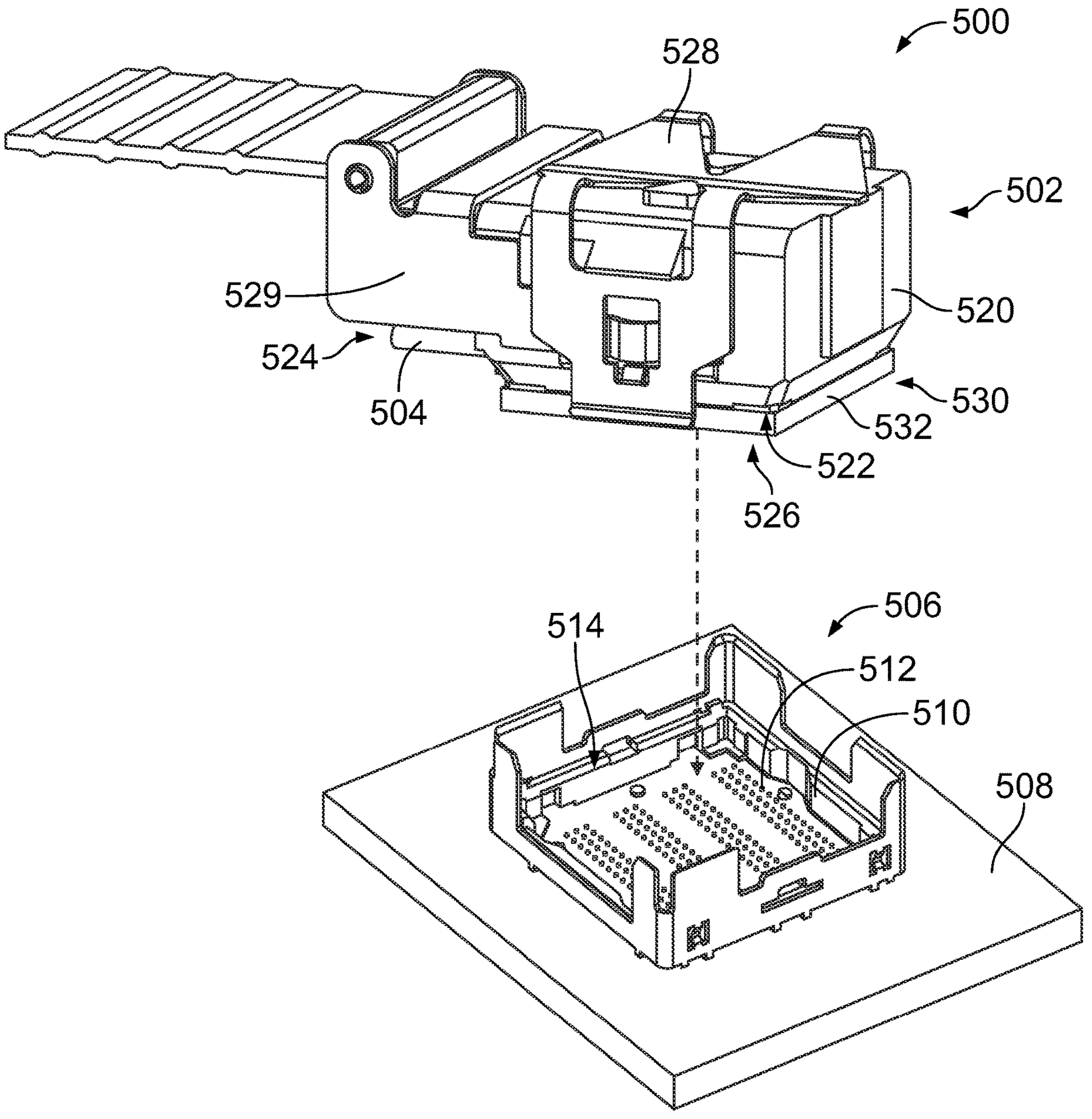
FIG. 27 is a perspective view of a communication system in accordance with an exemplary embodiment showing the first electrical connector and the second electrical connector in an unmated state.

FIG. 26 is a perspective view of a communication system 500 in accordance with an exemplary embodiment showing a first electrical connector 502 and a second electrical connector 506 in a mated state. FIG. 27 is a perspective view of a communication system 500 in accordance with an exemplary embodiment showing the first electrical connector 502 and the second electrical connector 506 in an unmated state. The first electrical connector 502 is provided at ends of cables 504. The second electrical connector 506 is mounted to a circuit board 508. In other various embodiments, the second electrical connector 506 may be provided at ends of cables (not shown).

In an exemplary embodiment, the first electrical connector 502 is a plug connector and the second electrical connector 506 is a socket connector. The second electrical connector 506 may be open at the top to receive the first electrical connector 502. For example, a portion of the first electrical connector 502 may be plugged into a socket or receptacle of the second electrical connector 506. In an exemplary embodiment, the first electrical connector 502 is coupled to the second electrical connector 506 at a separable interface. For example, the first electrical connector 502 is latchably coupled to the second electrical connector 506.

The second electrical connector 506 includes a socket housing 510 holding an array of contacts 512. In an exemplary embodiment, the socket housing 510 includes an opening 514 that receives the first electrical connector 502. The opening 514 is provided at the top in the illustrated embodiment. Other locations are possible in alternative embodiments. The contacts 512 have separable mating interfaces. The contacts 512 may define a compressible interface, such as including deflectable spring beams that are compressed when the first electrical connector 502 is received in the opening 514. Optionally, the contacts 512 may be arranged in multiple rows and columns. In various embodiments, the contacts 512 are a land grid array (LGA). The second electrical connector 506 may be a high-speed connector.

The first electrical connector 502 includes a housing 520 having a cavity 522 that receives a cable card assembly 530. The housing 520 may be generally rectangular having a top, bottom, front, rear and opposite ends. The cavity 522 may be open at one or more of the sides, such as the bottom and/or the rear to receive the cable card assembly 530. The housing 520 may be electrically conductive, such as being metal or plated plastic to provide shielding for the cable card assembly 530. The housing 520 has a cable end 524 and a mating end 526. The cables 504 extend from the cable end 524. Optionally, multiple rows of cables 504 may be provided. The mating end 526 is configured to be coupled to the second electrical connector 506. In the illustrated embodiment, the cable end 524 is at the rear of the housing 520 and the mating end 526 is at the bottom of the housing 520. Other locations are possible in alternative embodiments, including having the cable end 524 at the top. The cable card assembly 530 includes a circuit card 532. The circuit card 532 may be a paddle card. The cables 504 are configured to be terminated to the circuit card 532. The circuit card 532 is configured to be plugged into the socket housing 510 through the opening 514. In various embodiments, the contacts 512 of the second electrical connector 506 may be a land grid array (LGA). The bottom of the circuit card 532 may be loaded onto the LGA of contacts 512 to electrically connect the first electrical connector 502 with the second electrical connector 506. The circuit card 532 may be mated to another type of interface in alternative embodiments.

In an exemplary embodiment, the first electrical connector 502 includes a clip or latch 528 configured to couple the first electrical connector 502 to the housing 510 of the second electrical connector 506. The latch 528 is coupled to features on the housing 520, such as locating features or projections to position the latch 528 relative to the housing 520. The latch 528 may be used to provide a downward biasing force on the first electrical connector 502, such as to compress the contacts 512 at the mating interface. A latch release 529 is provided to release the latch 528 from the second electrical connector 506.

Figure 28:
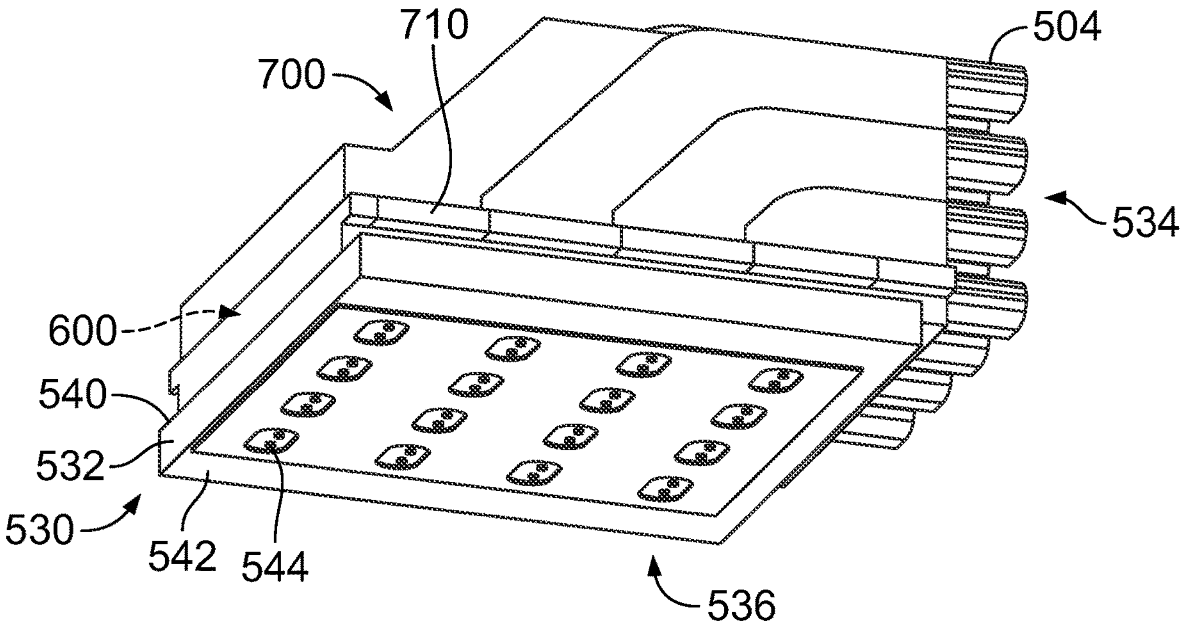
FIG. 28 is a bottom perspective view of the cable card assembly in accordance with an exemplary embodiment.
Figure 29:
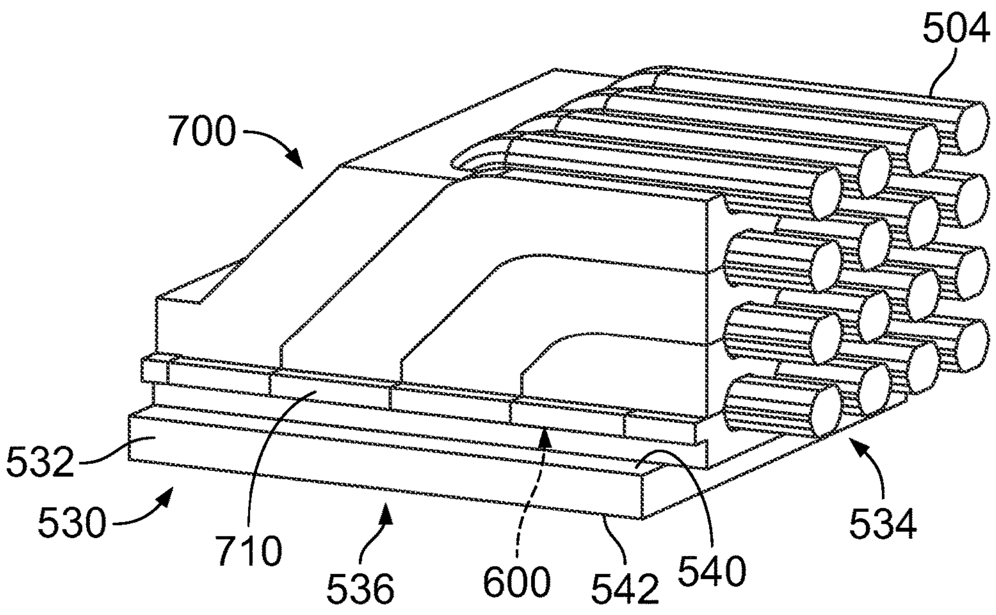
FIG. 29 is a rear perspective view of the cable card assembly in accordance with an exemplary embodiment.

FIG. 28 is a bottom perspective view of the cable card assembly 530 in accordance with an exemplary embodiment. FIG. 29 is a rear perspective view of the cable card assembly 530 in accordance with an exemplary embodiment. The cable card assembly 530 may be installed in the housing 520 (shown in FIG. 26) and is configured to be plugged into the housing 510 (shown in FIG. 26).

In an exemplary embodiment, the cable card assembly 530 includes the cables 504, the circuit card 532, a contact assembly 600, and a ground bus 700 separate and discrete from the contact assembly 600. The contact assembly 600 is coupled to the cables 504, such as signal conductors of the cables 504. The contact assembly 600 is coupled to the circuit card 532. For example, the contact assembly 600 is electrically connected to circuits or conductors of the circuit card 532. The ground bus 700 is coupled to the cables 504, such as cables shields of the cables 504. The ground bus 700 is coupled to the circuit card 532. For example, the ground bus 700 is electrically connected to circuits or conductors of the circuit card 532, such as to a ground plane of the circuit card 532.

The ground bus 700 provides electrical shielding for the signal conductors of the cables 504 and for signal contacts of the contact assembly 600. The ground bus 700 is electrically connected to the shield structures of the cables 504, such as to cable shields of the cables 504 and/or drain wires of the cables 504. In an exemplary embodiment, the ground bus 700 is soldered to the cable shields. However, the ground bus 700 may be electrically connected to the shield structures of the cables 504 by other means in alternative embodiments, such as soldering to the drain wires, welding to the drain wires, press-fitting the drain wires into a compliant feature of the ground bus 700, using conductive adhesive, using a conductive tape or braid, using a conductive gasket, conductive foam, conductive epoxy, and the like. The ground bus 700 may be coupled to the circuit card 532 at a solderless connection, such as at an interference or press-fit connection. The ground bus provides electrical shielding at the interface with the circuit card 532.

In various embodiments, multiple ground busses 700 may be provided, such as at the top side of the circuit card 532. The ground busses 700 provide shielding for the various rows of the cables 504. For example, the ground busses 700 may be located between different rows of the cables 504. The multiple ground busses 700 may be offset, such as shifted front-to-rear along the circuit card 532.

During assembly, the cables 504 are terminated to the contact assembly 600 and the contact assembly 600 is terminated to the circuit card 532. The cable card assembly 530, including the circuit card 532, the cables 504, the contact assembly 600, and the ground bus 700, may be loaded into the housing 520 (shown in FIG. 26), such as into a rear of the housing 520. The cable card assembly 530 may be positioned in the housing 520 using locating ribs 710 extending from the sides of the ground busses 700. Securing features may be provided, such as latches, fasteners or other securing devices, to secure the cable card assembly 530 in the housing 520. In an exemplary embodiment, the ends of the cables 504 may be surrounded by a strain relief element (not shown). For example, the strain relief element may be molded or otherwise formed around the cables 504. The strain relief element may be secured to the circuit card 532 and/or the ground busses 700.

The circuit card 532 includes a cable end 534 (for example, rear portion) and a mating end 536 (for example, bottom portion). The cables 504 extend rearward from the cable end 534 of the circuit card 532. The circuit card 532 includes an upper surface 540 and a lower surface 542. The cables 504 are connected to the circuit card 532 at the upper surface 540. The lower surface 542 defines the mating end 536 and is configured to be mated with second electrical connector 506 (shown in FIG. 26). The circuit card 532 includes circuit conductors 544, such as pads, traces, vias, and the like. In an exemplary embodiment, the circuit conductors 544 extend between the upper surface 540 and the lower surface 542 for connection to the contact assembly 600 and for connection to the second electrical connector 506, respectively. The circuit conductors 544 at the mating end 536 define mating conductors configured to be electrically connected to corresponding contacts 512 (shown in FIG. 27) of the second electrical connector 506. The mating conductors may be arranged in pairs and surrounded by a ground plane to provide shielding between the pairs. The circuit conductors 544 may include both signal conductors and ground conductors of the circuit card 532.

Figure 30:
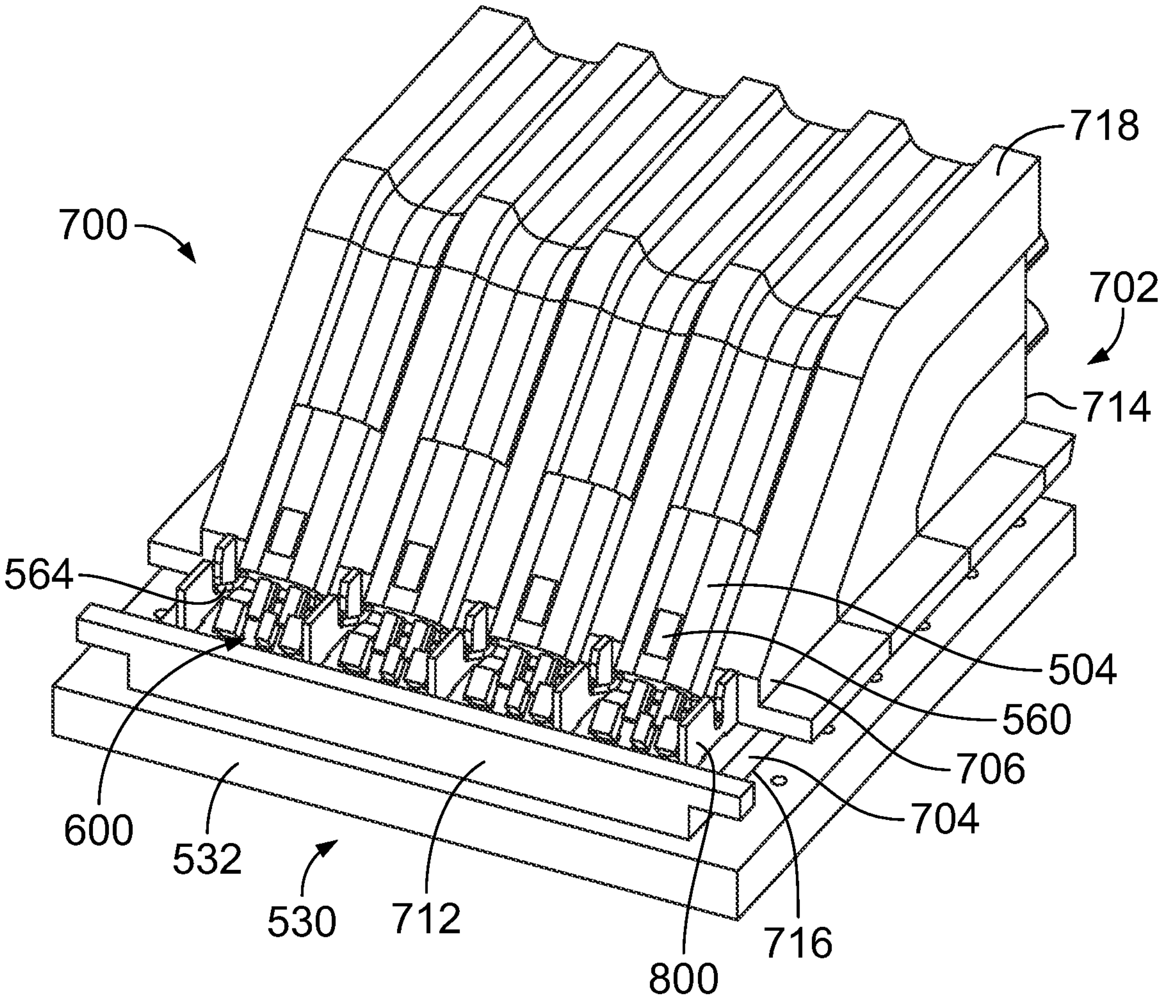
FIG. 30 is a perspective view of a portion of the cable card assembly in accordance with an exemplary embodiment.

FIG. 30 is a perspective view of a portion of the cable card assembly 530 in accordance with an exemplary embodiment. FIG. 30 shows the ground busses 700 surrounding the ends of the cables 504 and terminated to the circuit card 532, however, one of the ground busses 700 is removed to illustrate components of the cable card assembly 530. FIG. 30 shows the cable card assembly 530 having multiple rows of cables 504 and corresponding ground busses 700 with the cables 504 in the forward rows routed over (for example, flyover) the rearward located ground bus(es) 700. Other arrangements are possible in alternative embodiments.

The ground bus 700 is configured to be coupled to the contact assembly 600 to provide electrical shielding along the signal paths. The ground bus 700 provides electrical shielding for signals transmitted between the circuit card 532 and the cables 504. The ground bus 700 enhances electrical performance of the cable card assembly 530, such as by reducing cross talk. The ground bus 700 includes a shell 702 manufactured from a conductive material, such as a metal material to provide electrical shielding. In various embodiments, the ground bus 700 may be a diecast component. In other various embodiments, the ground bus 700 may be a stamped and formed component or a plated plastic component.

In an exemplary embodiment, the ground bus 700 is a multipiece structure. The ground bus 700 includes an inner bus member 704, an outer bus member 706, and ground blades 800 electrically connecting the inner and outer bus members 704, 706. The outer bus members 706 are configured to be located between the various rows of cables 504. Optionally, a single inner bus member 704 may be provided and coupled to the circuit card 532 and multiple outer bus members 706 are coupled to the common inner bus member 704. However, in alternative embodiments, multiple inner bus members 704 may be provided with the corresponding outer bus members 706. The ground blades 800 are used to mechanically and electrically connect the inner and outer bus members 704, 706. The inner bus member 704 is located between the outer bus member 706 and the circuit card 532. The cables 504 are received between the inner bus member 704 and the outer bus member 706. The ground blades 800 are located between the cables 504 to provide shielding between the cables 504. In an exemplary embodiment, both the inner bus member 704 and the outer bus member 706 are electrically connected to the cable shields 560 of the cables 504. For example, both the inner bus member 704 and the outer bus member 706 directly engage the cable shields 560 of the cables 504. The ground blades 800 may be electrically connected to the cables 504, such as having the drain wires 564 terminated to the ground blades 800.

The ground bus 700 extends between a front 712 and a rear 714. The rear 714 is configured to face the cables 504. The ground bus 700 extends between an inner end 716 and an outer end 718. The inner bus member 704 is at the inner end 716 and the outer bus member 706 is at the outer end 718. In various embodiments, the inner end 716 is at the bottom and is configured to face the circuit card 532. The inner end 716 may be mounted to the circuit card 532 to mechanically and electrically connect the ground bus 700 to the circuit card 532. The ground blades 800 are received in slots in the inner and outer bus members 704, 706, which may be open at the inner end 716 and/or the outer end 718 to receive the ground blades 800.

Figure 31:
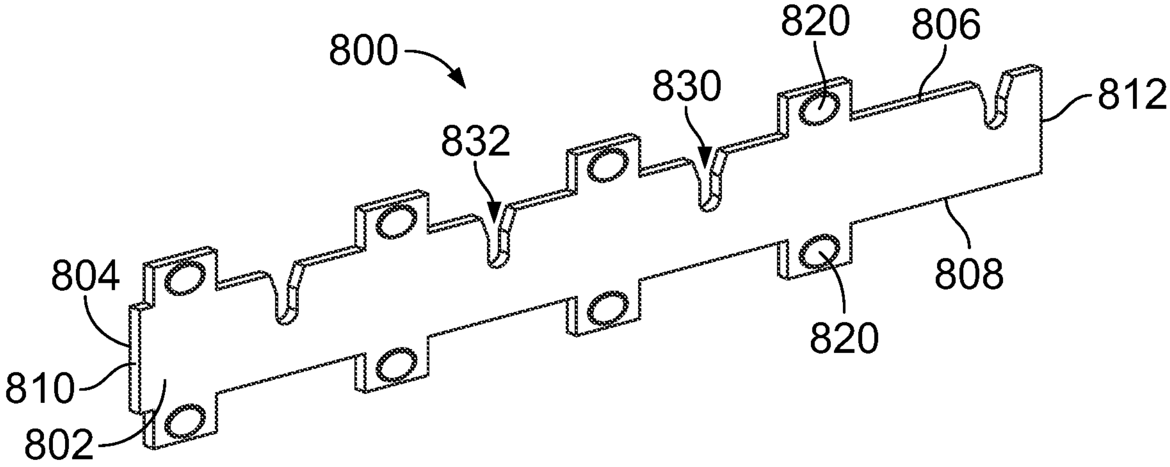
FIG. 31 is a perspective view of the ground blade in accordance with an exemplary embodiment.

FIG. 31 is a perspective view of the ground blade 800 in accordance with an exemplary embodiment. In an exemplary embodiment, the ground blade 800 is a conductive element configured to electrically connect the inner bus member(s) 704 and the outer bus member(s) 706 (shown in FIG. 30). The ground blade 800 may be manufactured from a metal material, such as copper, aluminum, steel, and the like. In an exemplary embodiment, the ground blade 800 is a stamped and formed part stamped from a metal sheet.

In an exemplary embodiment, the ground blade 800 is generally planar having a first side 802 and a second side 804. The ground blade 800 extends between a top 806 and a bottom 808. The ground blade 800 has a front 810 and a rear 812. The ground blade 800 is sized and shaped to fit in the inner bus member(s) 704 and the outer bus member(s) 706. In various embodiments, the ground blade 800 is configured to be coupled to each of the inner bus member(s) 704 and each of the outer bus members(s) 706 to electrically common all of the shells 702 of the ground busses 700. The ground blade 800 may be generally linear, such as having the top 806 and the bottom 808 generally parallel to each other. The ground blade 800 may have other shapes in alternative embodiments.

In an exemplary embodiment, the ground blade 800 includes one or more shell termination elements 820 configured to be electrically connected to the shell 702, such as the inner bus member(s) 704 and/or the outer bus member(s) 706. The shell termination elements 820 may extend from the first side 802 and/or the second side 804. In the illustrated embodiment, the shell termination elements 820 are bumps or bulges extending outward from the first side 802. However, other types of termination elements may be used in alternative embodiments, such as spring beams stamped from the main body of the ground blade 800. The shell termination elements 820 define points of contact with the shell 702 to electrically connect the ground blade 800 to the shell 702. The shell termination elements 820 may be press-fit into the shell 702 to electrically connect to the shell 702. Optionally, the shell termination elements 820 are provided on tabs extending from the top 806 and the bottom 808. In the illustrated embodiment, four sets of the shell termination elements 820 are provided. Greater or fewer shell termination elements 820 may be provided in alternative embodiments.

In an exemplary embodiment, the ground blade 800 includes one or more drain wire terminators 830 configured for termination of the drain wires 564 of the cables 504 (shown in FIG. 30). In the illustrated embodiment, the drain wire terminators 830 are slots 832 formed in the top 806. The slots 832 may be sized to receive multiple drain wires in various embodiments. Other types of drain wire terminators may be used in alternative embodiments, such as pads for welding or soldering.

Figure 32:
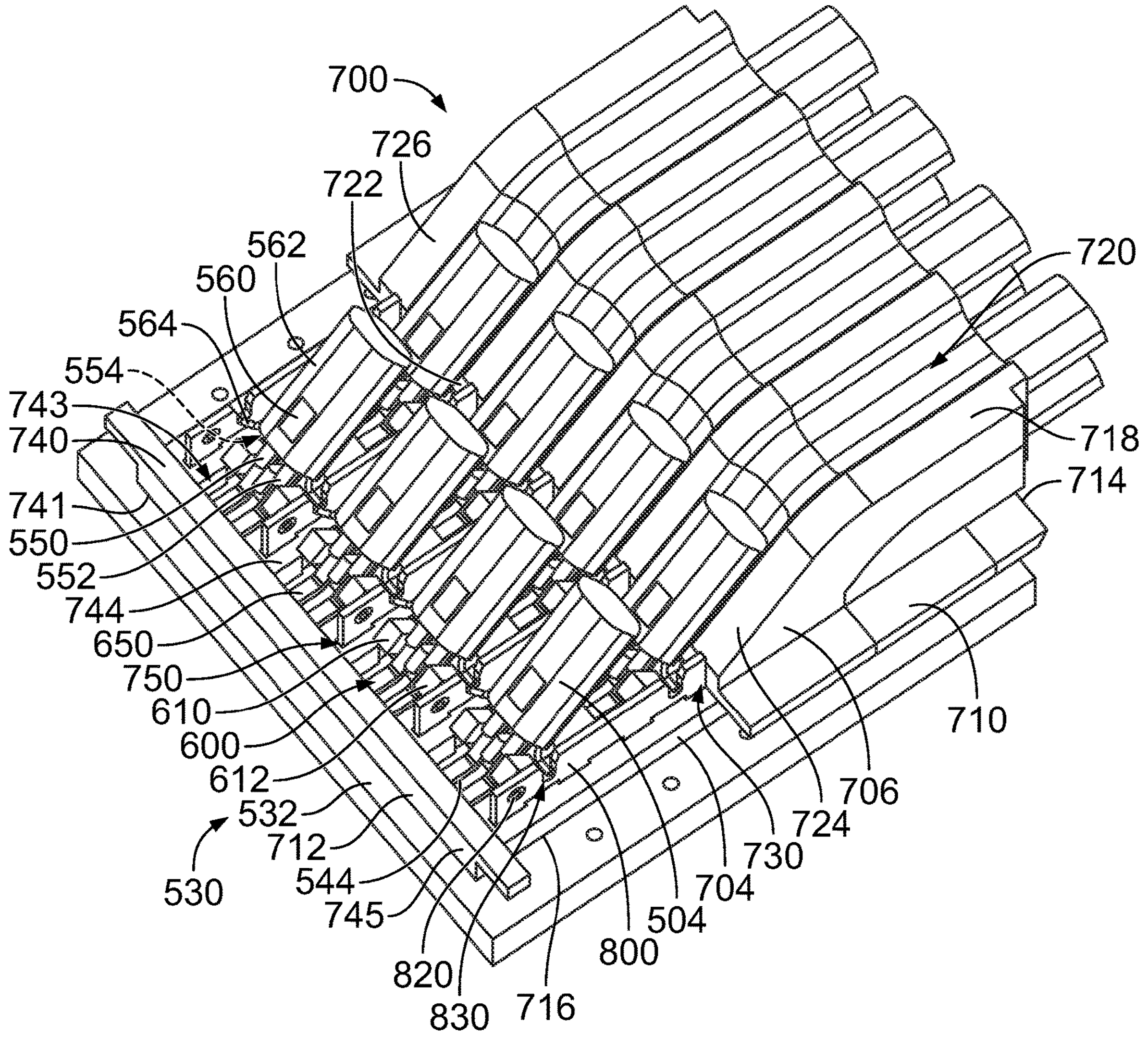
FIG. 32 is a perspective view of a portion of the cable card assembly in accordance with an exemplary embodiment.
Figure 33:
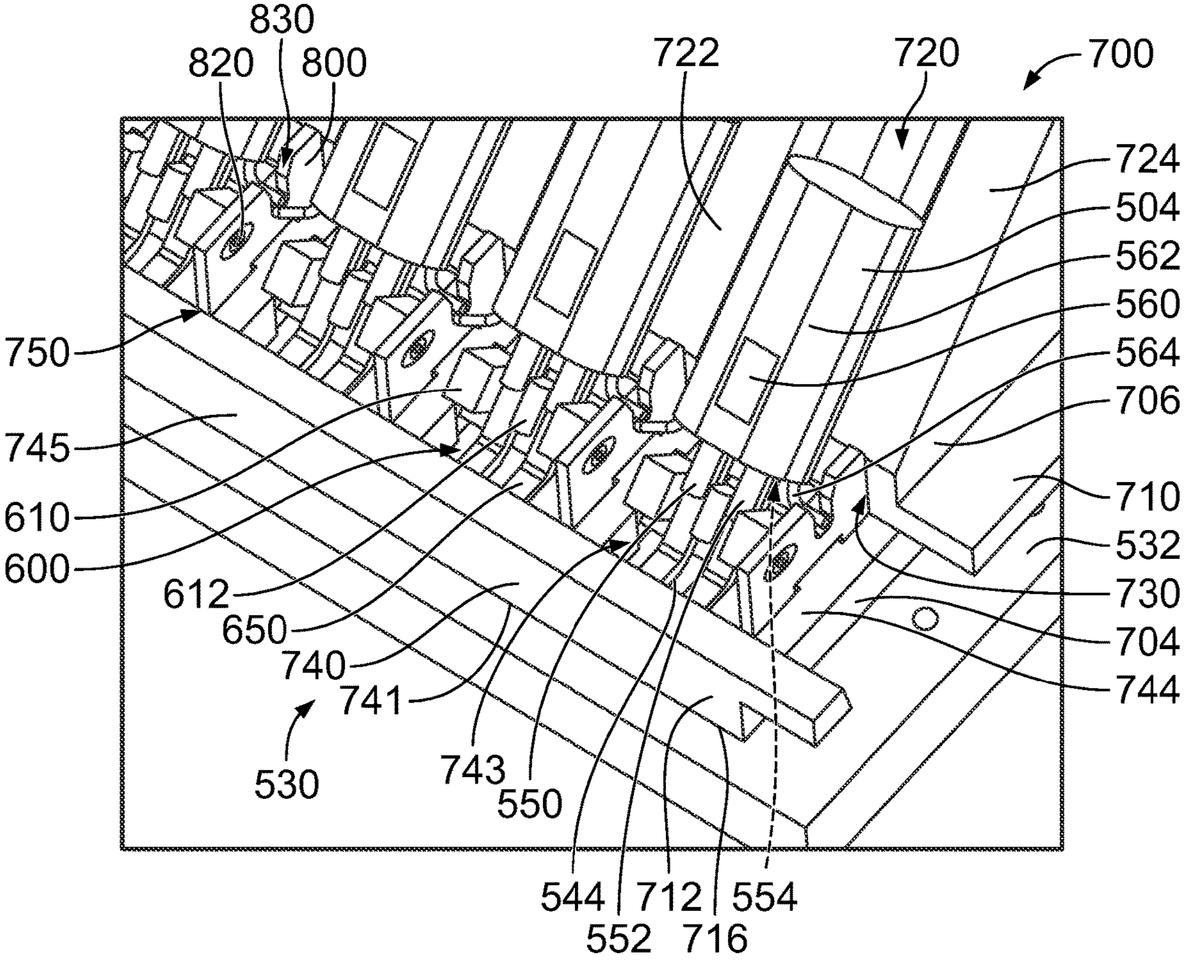
FIG. 33 is an enlarged perspective view of a portion of the cable card assembly in accordance with an exemplary embodiment.

FIG. 32 is a perspective view of a portion of the cable card assembly 530 in accordance with an exemplary embodiment. FIG. 33 is an enlarged perspective view of a portion of the cable card assembly 530 in accordance with an exemplary embodiment. FIGS. 32 and 33 show the ground busses 700 surrounding the ends of the cables 504 and terminated to the circuit card 532, however, portions of the ground busses 700 are removed to illustrate components of the cable card assembly 530. The contact assembly 600 provides a connectorized interface between the cables 504 and the circuit card 532. The contact assembly 600 enhances electrical performance of the cable card assembly 530, such as by controlling routing of the signal paths, controlling the dielectric material surrounding the signal paths, and providing robust interfaces between the circuit card 532 and the cables 504.

Each cable 504 includes at least one signal conductor and a shield structure providing electrical shielding for the at least one signal conductor. In an exemplary embodiment, the cables 504 are twin-axial cables. For example, each cable 504 includes a first signal conductor 550 and a second signal conductor 552. The signal conductors 550, 552 carry differential signals. The signal conductors 550, 552 are configured to be electrically connected to corresponding circuit conductors 544 of the circuit card 532 through the contact assembly 600. The cable 504 includes one or more insulators 554 surrounding the signal conductors 550, 552 and a cable shield 560 surrounding the insulators 554. The cable 504 includes a cable jacket 562 surrounding the cable shield 560. The cable 504 includes one or more drain wires 564 electrically connected to the cable shield 560.

The contact assembly 600 includes a contact holder 610 holding a plurality of signal contacts 650. In an exemplary embodiment, the signal contacts 650 are arranged in pairs. The contact holder 610 is manufactured from a dielectric material, such as a plastic material. The contact holder 610 is formed around the signal contacts 650 in various embodiments. For example, the signal contacts 650 may be formed as a lead frame and the contact holder 610 is overmolded around the lead frame. However, in alternative embodiments, the contact holder 610 may be preformed and the signal contacts 650 may be loaded or stitched into the contact holder 610. In an exemplary embodiment, the contact holder 610 includes contact blocks 612, each holding the corresponding signal contacts 650.

The outer bus members 706 are coupled to the inner bus member 704. The outer bus members 706 may be shaped differently depending on the row of cables 504 associated with the outer bus member 706. The outer bus members 706 may be stacked relative to each, such as between the front 712 and the rear 714 and/or between the inner end 716 and the outer end 718.

Each outer bus member 706 is manufactured from a conductive material, such as a metal material. In various embodiments, the outer bus member 706 is a diecast member. In other various embodiments, the outer bus member 706 may be a plated plastic member. The outer bus member 706 is configured to provide shielding for the cables 504 and the contact assembly 600. The outer bus member 706 includes cable channels 720 that receive the cables 504. The cable channels 720 may be provided on both sides of the outer bus member 706 to receive different rows of the cables 504. The outer bus member 706 includes separating walls 722 between the cable channels 720. The outer bus member 706 includes outer walls 724, 726 along the sides of the outer bus member 706. The outer walls 724, 726 include the locating ribs 710.

In an exemplary embodiment, the outer bus member 706 includes outer slots 730 configured to receive the ground blades 800. The outer slots 730 may be open at the bottom of the outer bus member 706 to receive the ground blades 800. The shell termination elements 820 of the ground blades 800 are configured to engage and connect to the outer bus member 706. For example, the bulges may be press fit into the outer slots 730 to mechanically and electrically connect to the outer bus member 706. In various embodiments, the outer slots 730 are aligned with the separating walls 722 and the outer walls 724, 726. For example, the outer slots 730 may be centered on the separating walls 722 and the outer walls 724, 726. Optionally, the outer bus member 706 may include protrusions extending into the outer slots 730, such as to engage the ground blades 800 to electrically connect the ground blades 800 to the outer bus member 706. For example, the protrusions may be bulges, tabs, spring beams, or other types of protrusions.

The inner bus member 704 extends between the front 712 and the rear 714. The inner bus member 704 is manufactured from a conductive material, such as a metal material. In various embodiments, the inner bus member 704 is a diecast member. In other various embodiments, the inner bus member 704 may be a plated plastic member. The inner bus member 704 is configured to provide shielding for the cables 504 and the contact assembly 600.

The inner bus member 704 includes a base 740 having a bottom 741 configured to be mounted to the circuit card 532. The base 740 includes pockets 743 that receive corresponding contact blocks 612 and the signal contacts 650. The base 740 includes separating walls 744 between the pockets 743. Optionally, the separating walls 744 may be connected by connecting walls 745 at the front 712 and the rear 714 of the inner bus member 704. Connecting walls may be provided at other locations between the front and the rear, such as between the contact blocks 612 to provide shielding between the signal contacts 650. The separating walls 744 provide shielding between the pockets 743 and the signal contacts 650 in the pockets 743. The separating walls 744 position the contact blocks 612 relative to each other.

In an exemplary embodiment, the inner bus member 704 includes inner slots 750 configured to receive the ground blades 800. The inner slots 750 may pass entirely through the inner bus member 704 to receive the ground blades 800, allowing the ground blades 800 to be connected to the circuit card 532. For example, the ground blades 800 may include compliant pins at the bottom configured to be press fit into plated vias in the circuit card 532 to electrically connect the ground blades 800 to the circuit card 532. In various embodiments, the inner slots 750 are open at the top to receive the ground blades 800 from above and have closed bottoms to support the ground blades 800 in the inner slots 750. The shell termination elements 820 of the ground blades 800 are configured to engage and connect to the inner bus member 704. For example, the bulges may be press fit into the inner slots 750 to mechanically and electrically connect to the inner bus member 704. In an exemplary embodiment, the inner slots 750 are aligned with the separating walls 744. For example, the inner slots 750 may be centered on the separating walls 744. Optionally, the inner bus member 704 may include protrusions extending into the inner slots 750, such as to engage the ground blades 800 to electrically connect the ground blades 800 to the inner bus member 704. For example, the protrusions may be bulges, tabs, spring beams, or other types of protrusions.

When assembled, the ground blades 800 are loaded in the inner slots 750 and the outer slots 730. The ground blades 800 electrically connect to the inner bus member 704 and the outer bus member 706. In an exemplary embodiment, the drain wires 564 are connected to the ground blades 800 to electrically connect the cables 504 to the ground busses 700. For example, the drain wires 564 are loaded into the drain wire terminators 830. The drain wires 564 may be soldered or welded to the ground blades 800 at the drain wire terminators 830. The drain wires 564 may additionally be electrically coupled to the inner bus member 704 and/or the outer bus member 706.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112 (f), unless and until such claim limitations expressly use the phrase "means for" followed by a statement of function void of further structure.

What is claimed is:

1. A cable card assembly for an electrical connector comprising:

a circuit card having an upper surface and a lower surface, the circuit card having a cable end and a mating end, the circuit card having mating conductors at the mating end for mating with a second electrical connector, the circuit card having circuit conductors at the cable end, the circuit card having a ground plane;

cables terminated to the circuit card, the cables including signal conductors and cable shields surrounding the corresponding signal conductors to provide electrical shielding for the signal conductors, the signal conductors including exposed portions extending forward of the cable shields;

a contact assembly coupled to the circuit card and coupled to the cables to electrically connect the signal conductors of the cables to the circuit conductors of the circuit card, the contact assembly including a contact holder holding signal contacts, each signal contact including a base tab and a mating tab, the base tab being terminated to the corresponding circuit conductor, the mating tab being terminated to the corresponding signal conductor; and a ground bus separate and discrete from the contact assembly and being coupled to the contact assembly, the ground bus being electrically connected to the cable shields to electrically connect the cable shields of the cables, the ground bus being electrically connected to the ground plane of the circuit card, the ground bus including a shell having an inner bus member and an outer bus member, the inner and outer bus members being conductive and providing electrical shielding, ends of the cables being located between the inner bus member and the outer bus member, the inner bus member being located between the cables and the circuit card, the ground bus including ground blades separate and discrete from the inner and outer bus members of the shell, the ground blades being received in the shell and located between the corresponding cables, the ground blades being electrically connected to the inner bus member and being electrically connected to the outer bus member.

2. The cable card assembly of claim 1, wherein the ground blades are stamped and formed having planar first and second sides.

3. The cable card assembly of claim 1, wherein the ground blades are press-fit into the inner bus member and the outer bus member to mechanically and electrically connect to the inner bus member and the outer bus member by an interference fit.

4. The cable card assembly of claim 1, wherein each ground blade includes shell termination elements coupled to the shell to electrically connect the ground blade to the shell.

5. The cable card assembly of claim 4, wherein the shell termination elements include deflectable spring beams coupled to the shell at separable mating interfaces.

6. The cable card assembly of claim 4, wherein the shell termination elements include bulges press-fit into the shell.

7. The cable card assembly of claim 1, wherein each ground blade includes a drain wire terminator configured to be terminated to a drain wire of the corresponding cable.

8. The cable card assembly of claim 7, wherein the drain wire terminators are soldered to the drain wires.

9. The cable card assembly of claim 7, wherein the drain wire terminators include slots configured to receive the corresponding drain wires.

10. The cable card assembly of claim 1, wherein the inner bus member includes inner slots and the outer bus member includes outer slots, the ground blades being received in the inner and outer slots.

11. The cable card assembly of claim 1, wherein the inner bus member includes locating grooves and inner slots in the locating grooves, the outer bus member including locating ribs and outer slots in the locating ribs, the locating ribs being received in the locating grooves to position the outer bus member relative to the inner bus member and align the outer slots with the inner slots, the ground blades being received in the inner slots and the outer slots.

12. The cable card assembly of claim 1, wherein the outer bus member includes locating openings, the inner bus member including locating pins, the locating pins being received in the locating openings when the outer bus member is coupled to the inner bus member, the ground blades being coupled to the locating pins to lock the locating pins in the locating openings.

13. The cable card assembly of claim 12, wherein the inner bus member includes inner slots extending through the locating pins, the ground blades being received in the slots in the locating pins.

14. A ground bus for electrically connecting cables to a circuit card of a cable card assembly, the ground bus comprising:

a shell including an inner bus member and an outer bus member separate and discrete from the inner bus member, the inner and outer bus members being conductive and providing electrical shielding, the inner bus member including a bottom configured to be mounted to the circuit card, the inner bus member including cable cradles configured to receive the corresponding cables, the inner bus member including openings configured to receive contacts of the cable card assembly terminated to ends of conductors of the cables for connection to the circuit card, the inner bus member configured to be positioned between the cables and the circuit card, the outer bus member including covers configured to cover the cables, the inner bus member being electrically conductive and providing shielding around portions of the cables, the outer bus member being electrically conductive and providing shielding around portions of the cables;

ground blades separate and discrete from the inner and outer bus members of the shell, the ground blades being received in the shell and configured to be positioned between the cables to provide shielding between the corresponding cables, the ground blades being electrically connected to the inner bus member and being electrically connected to the outer bus member.

15. The ground bus of claim 14, wherein the ground blades are press-fit into the inner bus member and the outer bus member to mechanically and electrically connect to the inner bus member and the outer bus member by an interference fit.

16. The ground bus of claim 14, wherein each ground blade includes shell termination elements coupled to the shell to electrically connect the ground blade to the at separable mating interfaces.

17. The ground bus of claim 14, wherein each ground blade includes a drain wire terminator configured to be terminated to a drain wire of the corresponding cable.

18. The ground bus of claim 14, wherein the inner bus member includes inner slots and the outer bus member includes outer slots, the ground blades being received in the inner and outer slots.

19. An electrical connector comprising:

a housing having walls forming a cavity, the housing having a mating end configured to be mated with a second electrical connector; and a cable card assembly received in the cavity of the housing, the cable card assembly including a circuit card, a contact assembly coupled to the circuit card, cables terminated to the contact assembly, and a ground bus coupled to the circuit card, the circuit card having an upper surface and a lower surface, the circuit card having a cable end and a mating end, the circuit card including a ground plane, the circuit card having circuit conductors at the cable end, the circuit card having mating conductors at the mating end, the cables including signal conductors and cable shields surrounding the corresponding signal conductors to provide electrical shielding for the signal conductors, the signal conductors having exposed portions extending forward of the cable shields, the contact assembly including a contact holder holding signal contacts for electrically connecting the signal conductors of the cables to the circuit conductors of the circuit card, each signal contact including a base tab and a mating tab, the base tab being terminated to the corresponding circuit conductor, the mating tab being terminated to the corresponding signal conductor, the ground bus being electrically connected to the cable shields to electrically connect the cable shields of the cables, the ground bus being electrically connected to the ground plane of the circuit card, the ground bus including a shell having an inner bus member and an outer bus member, the inner and outer bus members being conductive and providing electrical shielding, the ground bus including ground blades separate and discrete from the inner and outer bus members of the shell, the ground blades being received in the shell and located between the corresponding cables, the ground blades being electrically connected to the inner bus member and being electrically connected to the outer bus member.

20. The electrical connector of claim 19, wherein the mating end of the housing is provided at a bottom of the housing, the circuit card provided at the bottom, the mating conductors provided at the lower surface of the circuit card along the bottom of the housing, the mating end of the housing configured to be plugged into a socket of the second electrical connector to mate with the mating conductors with mating contacts of the second electrical connector in the socket.

21. The electrical connector of claim 19, wherein the mating end of the circuit card is provided at a front edge of the circuit card configured to be plugged into a card slot at a mating end of the second electrical connector.

22. The electrical connector of claim 19, wherein the shell includes locating ribs, the locating ribs received in a locating slot in the housing to position the cable card assembly in the cavity of the housing.

* * * * *